United States Patent
Kim et al.

(10) Patent No.: US 11,924,454 B2
(45) Date of Patent: *Mar. 5, 2024

(54) CODING TOOL SETTING METHOD AND VIDEO DECODING APPARATUS

(71) Applicant: SK TELECOM CO., LTD., Seoul (KR)

(72) Inventors: Jae Il Kim, Seoul (KR); Sun Young Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/106,639

(22) Filed: Feb. 7, 2023

(65) Prior Publication Data

US 2023/0188740 A1    Jun. 15, 2023

Related U.S. Application Data

(63) Continuation of application No. 17/345,052, filed on Jun. 11, 2021, now Pat. No. 11,616,967, which is a (Continued)

(30) Foreign Application Priority Data

Dec. 13, 2018 (KR) .................. 10-2018-0161254
Nov. 6, 2019 (KR) .................. 10-2019-0140653

(51) Int. Cl.
*H04N 19/46* (2014.01)
*H04N 19/176* (2014.01)
(Continued)

(52) U.S. Cl.
CPC .......... *H04N 19/46* (2014.11); *H04N 19/176* (2014.11); *H04N 19/189* (2014.11); *H04N 19/70* (2014.11)

(58) Field of Classification Search
CPC .... H04N 19/176; H04N 19/189; H04N 19/46; H04N 19/463; H04N 19/52; H04N 19/70
See application file for complete search history.

(56) References Cited

U.S. PATENT DOCUMENTS 9,451,256 B2   9/2016  Chen
9,912,966 B2   3/2018  Hannuksela
(Continued)

FOREIGN PATENT DOCUMENTS

EP              1230802 B1   1/2004
KR    10-2002-0064899 A     8/2002
(Continued)

OTHER PUBLICATIONS

Series, H. "Audiovisual and Multimedia Systems Infrastructure of audiovisual services—Coding of moving video." ITU-T, H.265 (2018) (Year: 2018).*

(Continued)

*Primary Examiner* — Maria E Vazquez Colon
(74) *Attorney, Agent, or Firm* — Hauptman Ham, LLP

(57) ABSTRACT

A coding tool setting method and a video decoding apparatus using the same are disclosed. An embodiment of the present invention relates to a method for setting whether or not to use a coding tool, and provides a coding tool setting method comprising the steps of: decoding, from a bitstream, a profile syntax element indicating a target profile among available profiles and a coding tool syntax element for configurable coding tools, the coding tool syntax element indicating whether or not to apply the coding tool; and setting, on the basis of the coding tool syntax element, target coding tools that are coding tools included in the target profile to be on or off.

18 Claims, 15 Drawing Sheets

Related U.S. Application Data continuation of application No. PCT/KR2019/017444, filed on Dec. 11, 2019.

(51) Int. Cl.
*H04N 19/189* (2014.01)
*H04N 19/70* (2014.01)

(56) References Cited

U.S. PATENT DOCUMENTS

| | | | |
|---|---|---|---|
| 2014/0098851 A1 | 4/2014 | Chen et al. | |
| 2016/0219275 A1 | 7/2016 | Suzuki et al. | |
| 2020/0128062 A1* | 4/2020 | Wenger | H04L 67/303 |
| 2022/0086493 A1* | 3/2022 | Francois | H04N 19/157 |

FOREIGN PATENT DOCUMENTS

| | | | | |
|---|---|---|---|---|
| KR | 10-2015-0036599 A | 4/2015 | | |
| KR | 10-2015-0065838 A | 6/2015 | | |
| KR | 10-2016-0105518 A | 9/2016 | | |
| WO | 2020/058567 A1 | 3/2020 | | |
| WO | WO-2020058567 A1 * | 3/2020 | ........... | H04N 19/156 |
| WO | 2020/102067 A1 | 5/2020 | | |
| WO | WO-2020102067 A1 * | 5/2020 | ........... | H04N 19/119 |

OTHER PUBLICATIONS

International Search Report dated Mar. 25, 2020, corresponding to International Patent Application No. PCT/KR2019/017444, 4 pages.

Boyce et al. ("Interoperability point signaling for VVC", 11. JVET Meeting; Jul. 11-18, 2018, Ljubljana; (the Joint Video Exploration Team of ISO/IEC JTC1/SC291WG11 and ITU-T SG. 16), no. JVET-K0311 Aug. 30, 2018, XP030249821) (Year: 2018).

Chinese Office Action dated Aug. 23, 2023 for corresponding Chinese Patent Application No. 201980081961.0, 16 pages.

* cited by examiner

CODING TOOL SETTING METHOD AND VIDEO DECODING APPARATUS

CROSS-REFERENCE TO RELATED APPLICATION

This application is a continuation of U.S. patent application Ser. No. 17/345,052, filed on Jun. 11, 2021, which is a continuation of International Patent Application No. PCT/KR2019/017444, filed on Dec. 11, 2019, which is based on and claims priority to Korean Patent Application No. 10-2018-0161254, filed on Dec. 13, 2018, and Korean Patent Application No. 10-2019-0140653, filed on Nov. 6, 2019, which are incorporated herein by reference in their entireties.

TECHNICAL FIELD

The present disclosure relates to encoding and decoding of a video, and more particularly, to a coding tool setting method and a video decoding apparatus for improving encoding and decoding efficiency.

BACKGROUND

Since the volume of video data is larger than that of voice data or still image data, storing or transmitting video data without processing for compression requires a lot of hardware resources including memory.

Accordingly, in storing or transmitting video data, the video data is generally compressed using an encoder so as to be stored or transmitted. Then, a decoder receives the compressed video data, and decompresses and reproduces the video data. Compression techniques for such video include H.264/AVC and High Efficiency Video Coding (HEVC), which improves coding efficiency over H.264/AVC by about 40%.

However, the video size, resolution, and frame rate are gradually increasing, and accordingly the amount of data to be encoded is also increasing. Accordingly, a new compression technique having better encoding efficiency and higher image quality than the existing compression technique is required.

SUMMARY

Technical Problem

In order to meet these needs, the present disclosure aims to provide an improved video encoding and decoding technology. In particular, an aspect of the present disclosure relates to is a technique for improving the encoding and decoding efficiency by presenting information on a coding tool actually used among coding tools supported by a profile.

Technical Solution

According to at least one aspect, the present disclosure provides a method of setting whether to enable a coding tool. The method comprises: decoding, from a bitstream, a profile syntax element indicating a target profile among one or more available profiles, and a coding tool syntax element for one or more configurable coding tools, the coding tool syntax element indicating whether to apply the coding tool; and setting whether to turn on/off one or more target coding tools included in the target profile based on the coding tool syntax element.

According to another aspect, the present disclosure provides a video decoding apparatus comprises: a decoder configured to decode, from a bitstream, a profile syntax element indicating a target profile among one or more available profiles, and a coding tool syntax element for one or more configurable coding tools, the coding tool syntax element indicating whether to apply the coding tool; and a control means configured to set whether to turn on/off one or more target coding tools included in the target profile based on the coding tool syntax element.

Advantageous Effects

As described above, according to an embodiment of the present disclosure, only information on a coding tool actually used among coding tools supported by a profile is signaled. Accordingly, bit efficiency for setting a coding tool may be improved.

According to another embodiment of the present disclosure, the coding tool actually used may be identified. Accordingly, encoding and decoding may be implemented more adaptively.

DETAILED DESCRIPTION

Figure 1:
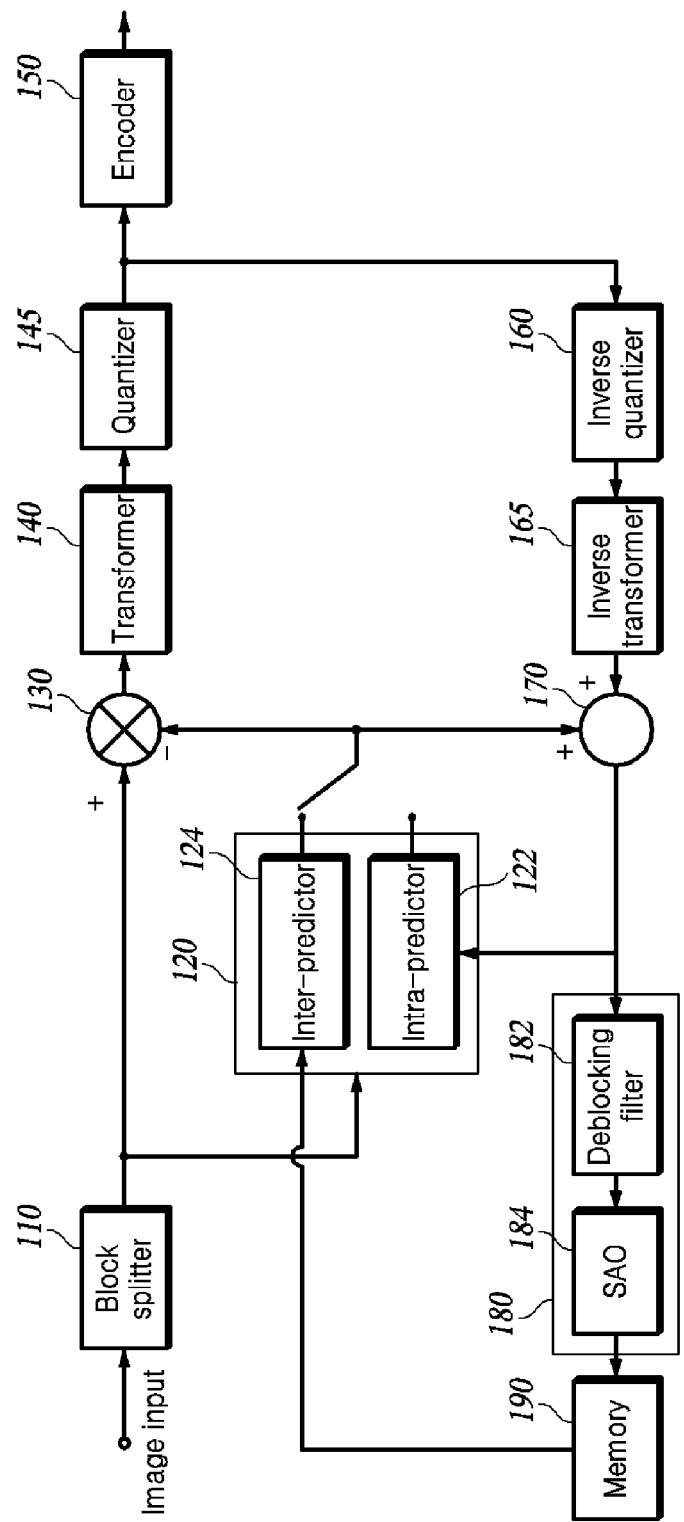
FIG. 1 is an exemplary block diagram of a video encoding apparatus capable of implementing the techniques of the present disclosure.

Hereinafter, some embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of the present disclosure, a detailed description of known functions and configurations incorporated herein will be omitted to avoid obscuring the subject matter of the present disclosure.

FIG. 1 is an exemplary block diagram of a video encoding apparatus capable of implementing the techniques of the present disclosure. Hereinafter, a video encoding apparatus and elements of the apparatus will be described with reference to FIG. 1.

The video encoding apparatus includes a block splitter 110, a predictor 120, a subtractor 130, a transformer 140, a quantizer 145, an encoder 150, an inverse quantizer 160, an inverse transformer 165, an adder 170, a filter unit 180, and a memory 190.

Each element of the video encoding apparatus may be implemented in hardware or software, or a combination of hardware and software. The functions of the respective elements may be implemented in software, and a microprocessor may be implemented to execute the software functions corresponding to the respective elements.

One video is composed of a plurality of pictures. Each picture is split into a plurality of regions, and encoding is performed on each region. For example, one picture is split into one or more tiles and/or slices. Here, the one or more tiles may be defined as a tile group. Each tile or slice is split into one or more coding tree units (CTUs). Each CTU is split into one or more coding units (CUs) by a tree structure. Information applied to each CU is encoded as the syntax of the CU, and information applied to CUs included in one CTU in common is encoded as the syntax of the CTU. In addition, information applied to all blocks in one tile in common is encoded as the syntax of the tile or encoded as the syntax of a tile group, which is a collection of multiple tiles, and information applied to all blocks constituting one picture is encoded in a picture parameter set (PPS) or a picture header. Further, information referred to by a plurality of pictures in common is encoded in a sequence parameter set (SPS). In addition, information referred to by one or more SPSs in common is encoded in a video parameter set (VPS).

The block splitter 110 determines the size of a coding tree unit (CTU). Information about the size of the CTU (CTU size) is encoded as the syntax of the SPS or PPS and is transmitted to the video decoding apparatus.

The block splitter 110 splits each picture constituting a video into a plurality of CTUs having a predetermined size, and then recursively splits the CTUs using a tree structure. In the tree structure, a leaf node serves as a coding unit (CU), which is a basic unit of coding.

The tree structure may be a QuadTree (QT), in which a node (or parent node) is split into four sub-nodes (or child nodes) having the same size, a BinaryTree (BT), in which a node is split into two sub-nodes, a TernaryTree (TT), in which a node is split into three sub-nodes at a ratio of 1:2:1, or a structure formed by a combination of two or more of the QT structure, the BT structure, and the TT structure. For example, a QTBT (QuadTree plus BinaryTree) structure or a QTBTTT (QuadTree plus BinaryTree TernaryTree) structure may be used. Here, BTTTs may be collectively referred to as a multiple-type tree (MTT).

Figure 2:
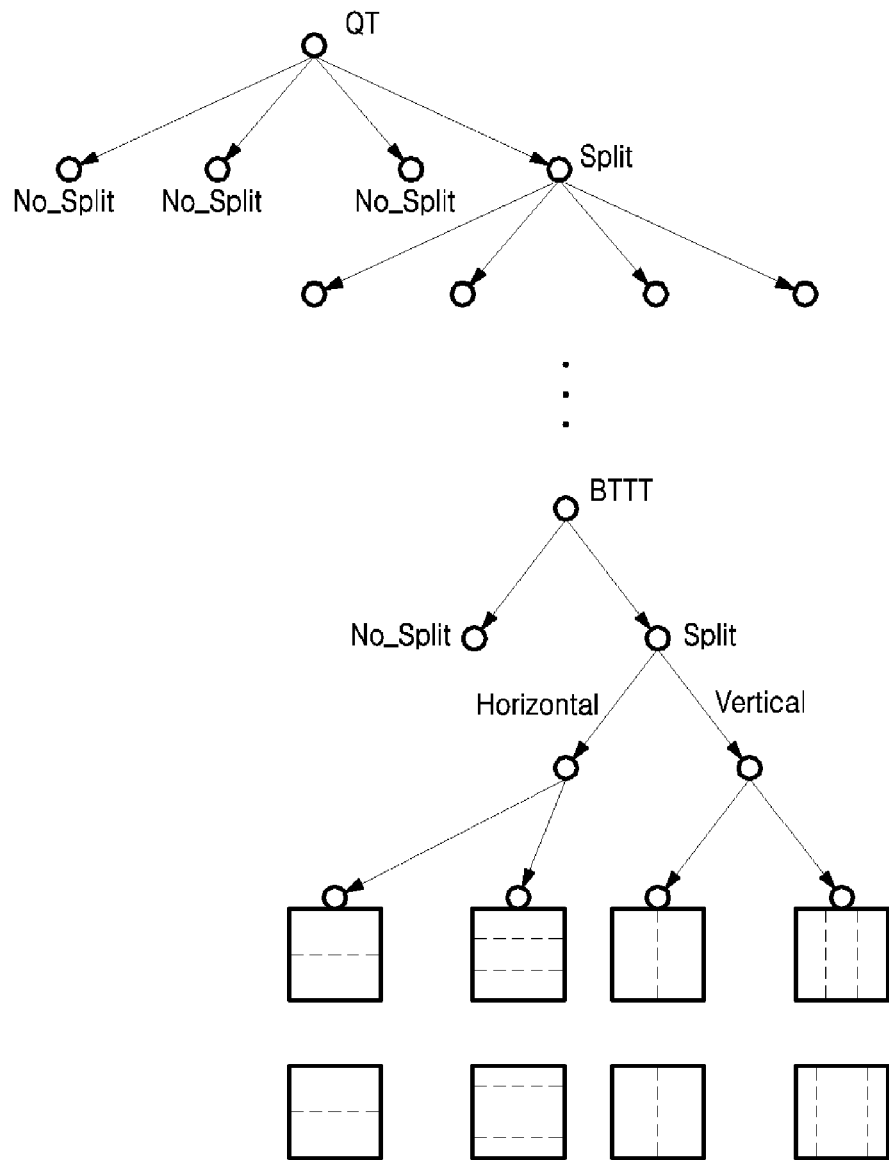
FIG. 2 exemplarily shows a block partitioning structure using a QTBTTT structure.

FIG. 2 shows a QTBTTT splitting tree structure. As shown in FIG. 2, a CTU may be initially split in the QT structure. The QT splitting may be repeated until the size of the splitting block reaches the minimum block size (MinQTSize) of a leaf node allowed in the QT. A first flag (QT_split_flag) indicating whether each node of the QT structure is split into four nodes of a lower layer is encoded and signaled to the video decoding apparatus by the encoder 150. When the leaf node of the QT is not larger than the maximum block size (MaxBTSize) of the root node allowed in BT, it may be further split in one or more of the BT structure or the TT structure. In the BT structure and/or the TT structure, there may be a plurality of splitting directions. For example, there may be two directions, which are horizontal splitting and vertical splitting of the block of the node. As shown in FIG. 2, when MTT splitting starts, a second flag (mtt_split_flag) indicating whether nodes are split, and a flag indicating a splitting direction (vertical or horizontal), and/or a flag indicating a splitting type (Binary or Ternary) are encoded and signaled to the video decoding apparatus by the encoder 150.

As another example of the tree structure, when a block is split using the QTBTTT structure, information about a CU split flag (split_cu_flag) indicating that the block has been split and a QT split flag (split_qt_flag) indicating whether the splitting type is QT splitting is encoded and signaled to the video decoding apparatus by the encoder 150. When the value of split_cu_flag indicates that the block has not been split, the block of the node becomes a leaf node in the splitting tree structure and is used as a coding unit (CU), which is a basic unit of encoding. When the value of split_cu_flag indicates that the block has not been split, whether the splitting type is QT or MTT is distinguished by the value of split_qt_flag. When the splitting type is QT, there is no additional information. When the splitting type is MTT, a flag (mtt_split_cu_vertical_flag) indicating the MTT splitting direction (vertical or horizontal) and/or a flag (mtt_split_cu_binary_flag) indicating the MTT splitting type (Binary or Ternary) are encoded and signaled to the video decoding apparatus by the encoder 150.

As another example of the tree structure, when QTBT is used, there may be two splitting types, which are horizontal splitting (i.e., symmetric horizontal splitting) and vertical splitting (i.e., symmetric vertical splitting) of a block of a node into two blocks of the same size. A split flag (split_flag) indicating whether each node of the BT structure is split into blocks of a lower layer and split type information indicating the splitting type are encoded and transmitted to the video decoding apparatus by the encoder 150. There may be an additional type, which is splitting a block of a node into two asymmetric blocks. The asymmetric splitting type may include a type of splitting a block into two rectangular blocks at a size ratio of 1:3, and a type of diagonally splitting a block of a node.

CUs may have various sizes according to QTBT or QTBTTT splitting of a CTU. Hereinafter, a block corresponding to a CU (i.e., a leaf node of QTBTTT) to be encoded or decoded is referred to as a "current block."

The predictor 120 predicts a current block to generate a predicted block. The predictor 120 includes an intra-predictor 122 and an inter-predictor 124.

In general, each of the current blocks in a picture may be predictively coded. Prediction of a current block may be performed using the technique of intra-prediction (which is performed based on the data from a picture containing the current block) or the technique of inter-prediction (which is performed based on the data from a picture coded before the picture containing the current block). Inter-prediction includes both unidirectional prediction and bi-directional prediction.

Figure 3:
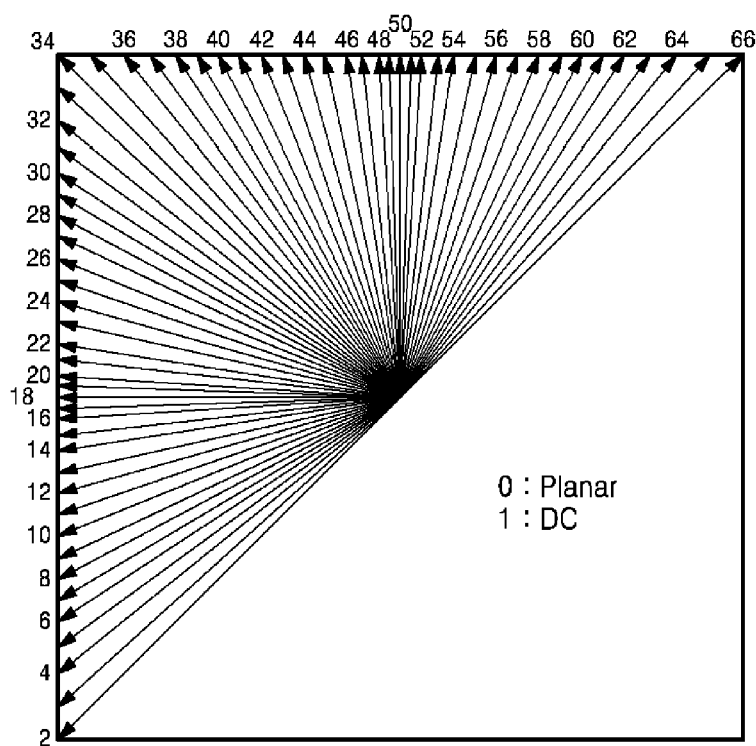
FIG. 3 exemplarily shows a plurality of intra-prediction modes.

The intra-predictor 122 predicts pixels in the current block using pixels (reference pixels) located around the current block in the current picture including the current block. There is a plurality of intra-prediction modes according to the prediction directions. For example, as shown in FIG. 3, the plurality of intra-prediction modes may include non-directional modes, which include a planar mode and a DC mode, and 65 directional modes. Neighboring pixels and an equation to be used are defined differently for each prediction mode.

The intra-predictor 122 may determine an intra-prediction mode to be used in encoding the current block. In some examples, the intra-predictor 122 may encode the current block using several intra-prediction modes and select an appropriate intra-prediction mode to use from the tested modes. For example, the intra-predictor 122 may calculate rate distortion values using rate-distortion analysis of several tested intra-prediction modes, and may select an intra-prediction mode that has the best rate distortion characteristics among the tested modes.

The intra-predictor 122 selects one intra-prediction mode from among the plurality of intra-prediction modes, and predicts the current block using neighboring pixels (reference pixel) and an equation determined according to the selected intra-prediction mode. Information about the selected intra-prediction mode is encoded by the encoder 150 and transmitted to the video decoding apparatus.

The inter-predictor 124 generates a predicted block for the current block through a motion compensation process. The inter-predictor searches for a block most similar to the current block in a reference picture encoded and decoded earlier than the current picture, and generates a predicted block for the current block based on the searched block. Then, the inter-predictor generates a motion vector corresponding to a displacement between the current block in the current picture and the predicted block in the reference picture. In general, motion estimation is performed on a luma component, and a motion vector calculated based on the luma component is used for both the luma component and the chroma component. Motion information including information on the reference picture used to predict the current block and information on the motion vector is encoded and transmitted to the video decoding apparatus by the encoder 150.

The subtractor 130 generates a residual block by subtracting the predicted block generated by the intra-predictor 122 or the inter-predictor 124 from the current block.

The transformer 140 transforms a residual signal in a residual block having pixel values in the spatial domain into a transform coefficient in the frequency domain. The transformer 140 may transform the residual signals in the residual block using the total size of the current block as a transformation unit. Alternatively, the transformer may split the residual block into sub-blocks of a transform region and non-transform region, and transform the residual signals using only the sub-block of the transform region as a transformation unit. Here, the transform region sub-block may be one of two rectangular blocks having a size ratio of 1:1 based on the horizontal axis (or vertical axis). In this case, a flag (cu_sbt_flag) indicating that only the subblock has been transformed, directional (vertical/horizontal) information (cu_sbt_horizontal_flag), and/or location information (cu_sbt_pos_flag) are encoded and signaled to the video decoding apparatus by the encoder 150. In addition, the size of the transform region sub-block may have a size ratio of 1:3 based on the horizontal axis (or vertical axis). In this case, a flag (cu_sbt_quad_flag) for distinguishing the splitting is additionally encoded signaled to the video decoding apparatus by the encoder 150.

The quantizer 145 quantizes transform coefficients output from the transformer 140, and outputs the quantized transform coefficients to the encoder 150.

The encoder 150 generates a bitstream by encoding the quantized transform coefficients using an encoding method such as Context-based Adaptive Binary Arithmetic Code (CABAC). The encoder 150 encodes information such as the CTU size, CU split flag, QT split flag, MTT splitting direction, and MTT splitting type related to block splitting, such that the video decoding apparatus splits the block in the same manner as the video encoding apparatus.

Further, the encoder 150 encodes information about a prediction type indicating whether the current block is encoded by intra-prediction or by inter-prediction, and encodes intra-prediction information (i.e., information about an intra-prediction mode) or inter-prediction information (information about a reference picture and a motion vector) according to the prediction type.

The inverse quantizer 160 inversely quantizes the quantized transform coefficients output from the quantizer 145 to generate transform coefficients. The inverse transformer 165 transforms the transform coefficients output from the inverse quantizer 160 from the frequency domain to the spatial domain and reconstructs the residual block.

The adder 170 adds the reconstructed residual block to the predicted block generated by the predictor 120 to reconstruct the current block. The pixels in the reconstructed current block are used as reference pixels for intra-prediction of the next block.

The filter unit 180 filters the reconstructed pixels to reduce blocking artifacts, ringing artifacts, and blurring artifacts generated due to block-based prediction and transformation/quantization. The filter unit 180 may include a deblocking filter 182 and a sample adaptive offset (SAO) filter 184.

The deblocking filter 180 filters the boundary between the reconstructed blocks to remove blocking artifacts caused by block-by-block encoding/decoding, and the SAO filter 184 additionally filters the deblocking filtered video. The SAO filter 184 is a filter used to compensate for a difference between a reconstructed pixel and an original pixel caused by lossy coding.

The reconstructed blocks filtered through the deblocking filter 182 and the SAO filter 184 are stored in the memory 190. Once all blocks in one picture are reconstructed, the reconstructed picture is used as a reference picture for inter-prediction of blocks in the next picture to be encoded.

Although not shown in FIG. 1, the video encoding apparatus may further include a control means to set whether to use or apply coding tools for each profile, using one or more syntax elements. The control means may be implemented on the same physical element (processor, etc.) as that for the subordinate elements illustrated in FIG. 1, or may be implemented on a different physical element than that for the subordinate elements illustrated in FIG. 1. Details of the control means will be described later.

Figure 4:
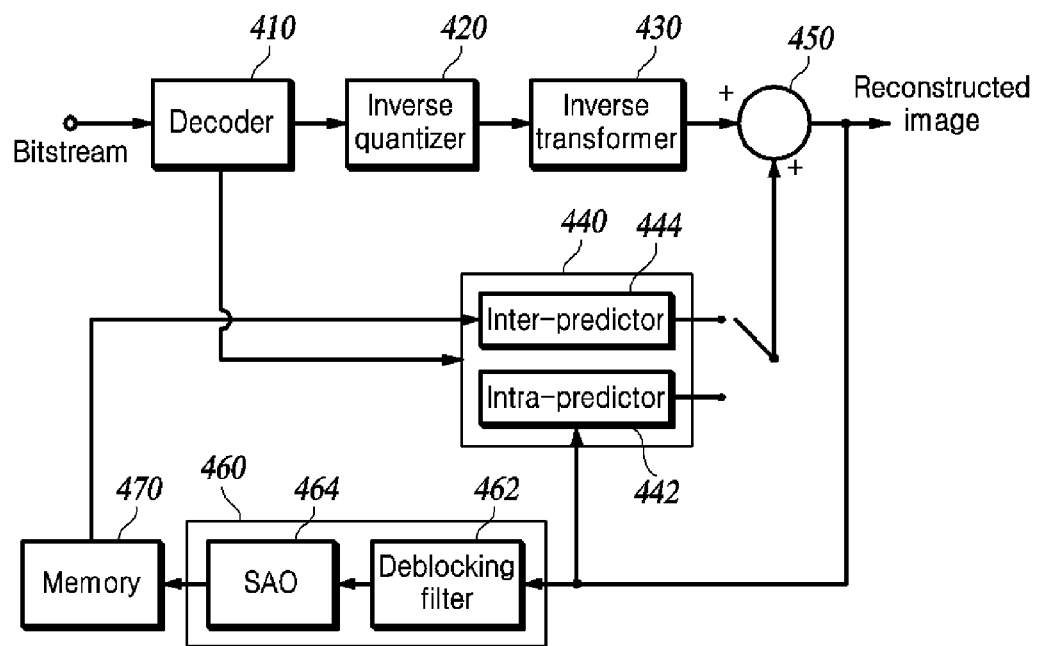
FIG. 4 is an exemplary block diagram of a video decoding apparatus capable of implementing the techniques of the present disclosure.
Figure 5:
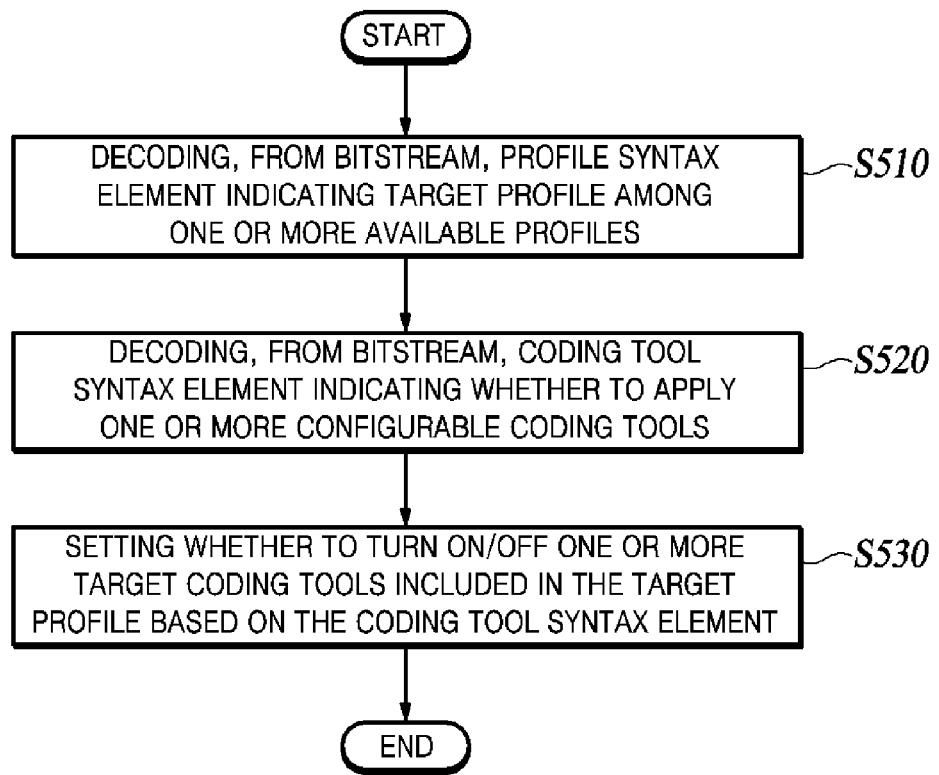
FIGS. 5 to 12 are flowcharts illustrating various embodiments of the present disclosure for setting use of coding tools.
Figure 6:
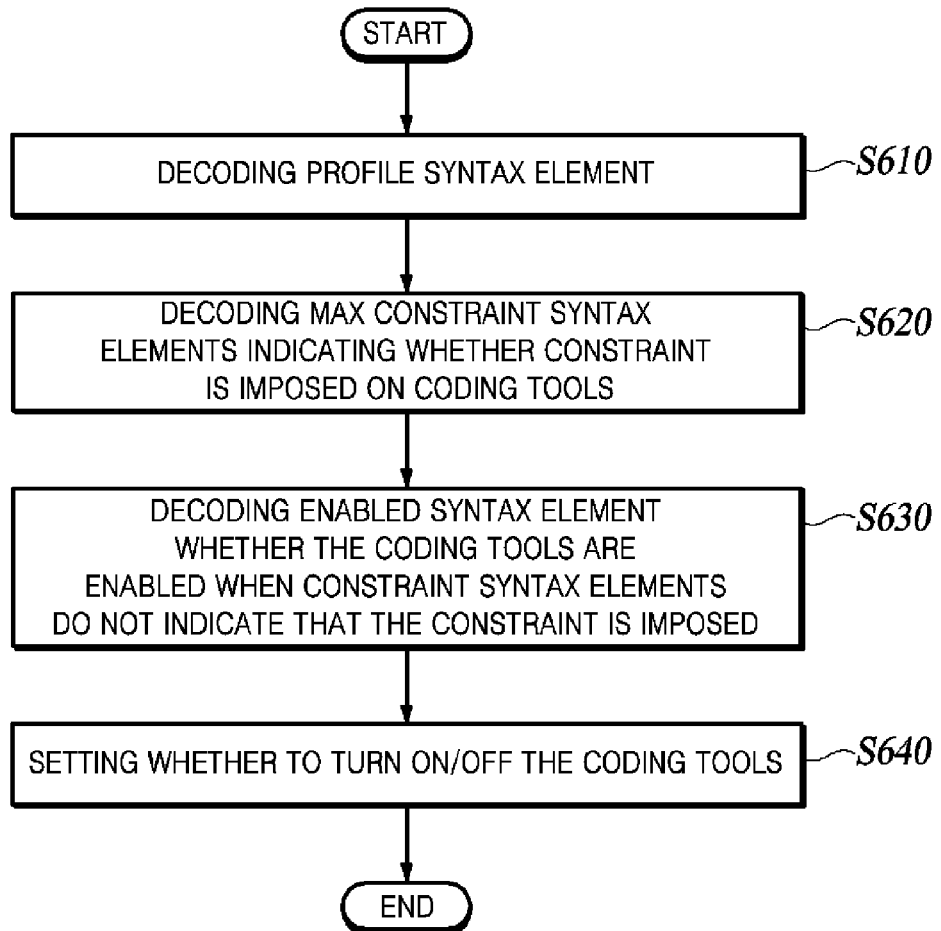
Figure 7:
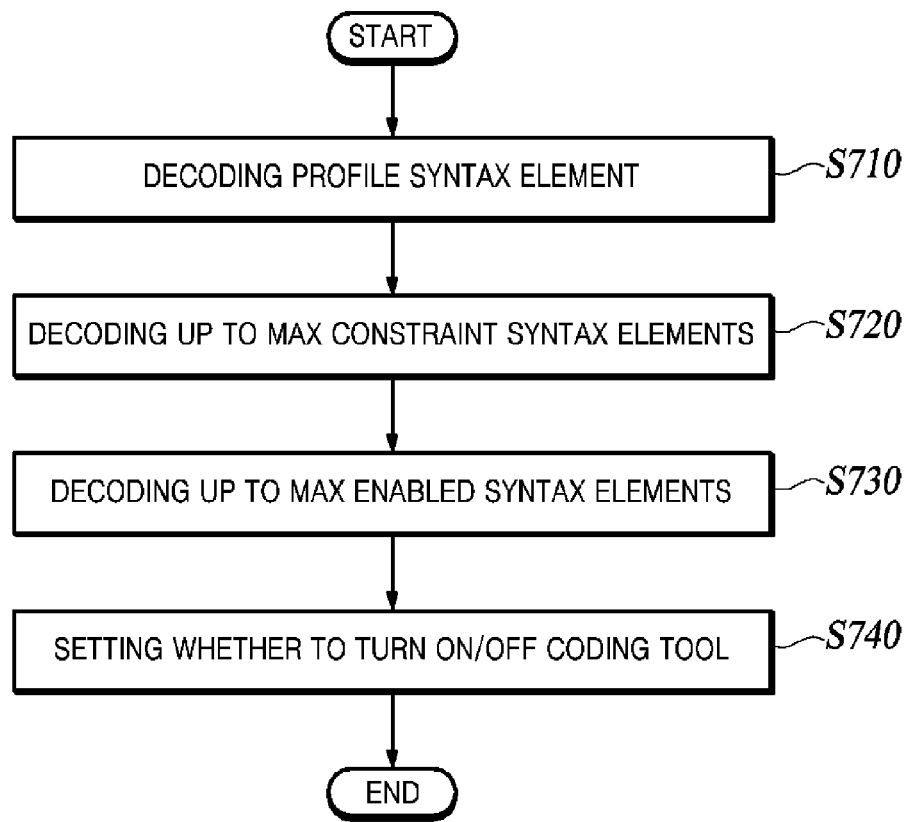
Figure 8:
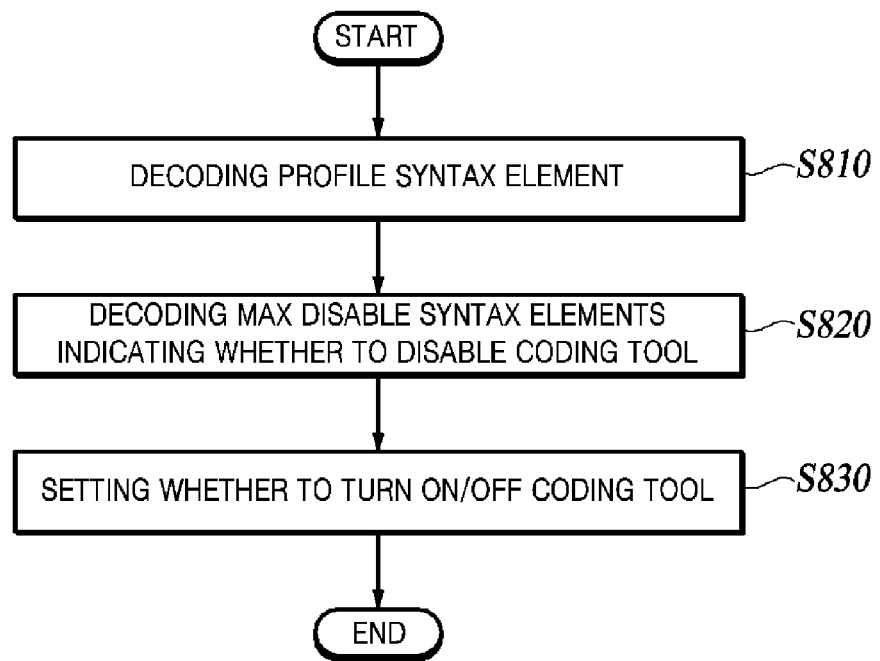
Figure 9:
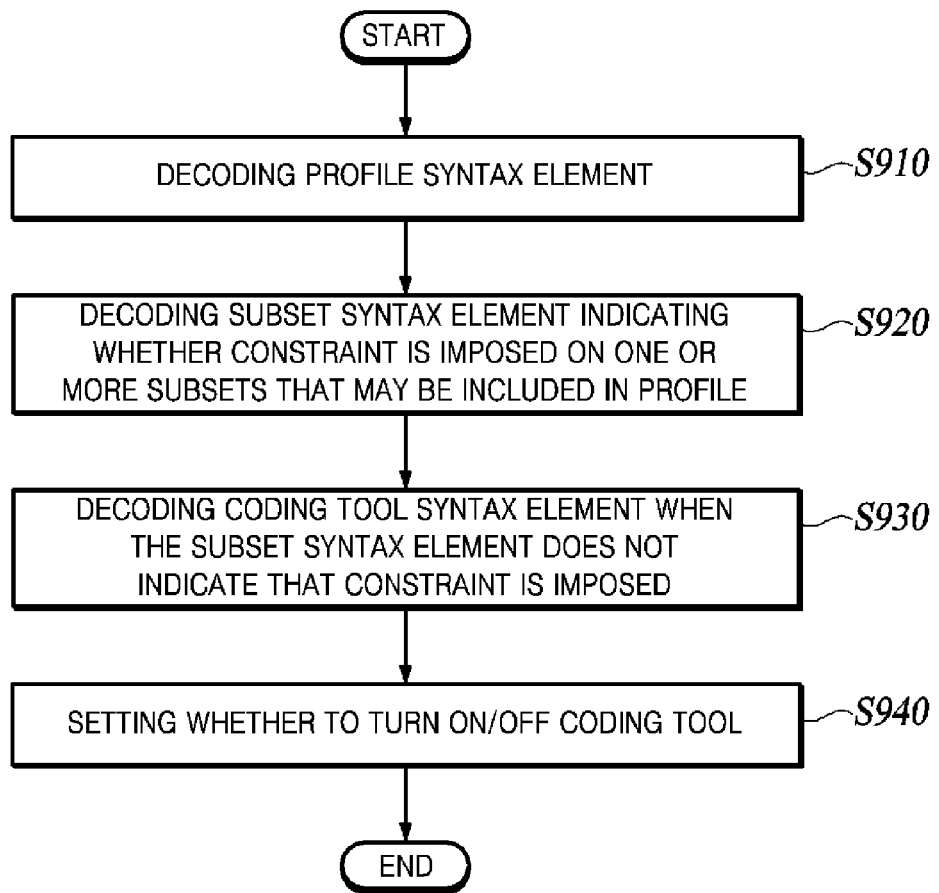
Figure 10:
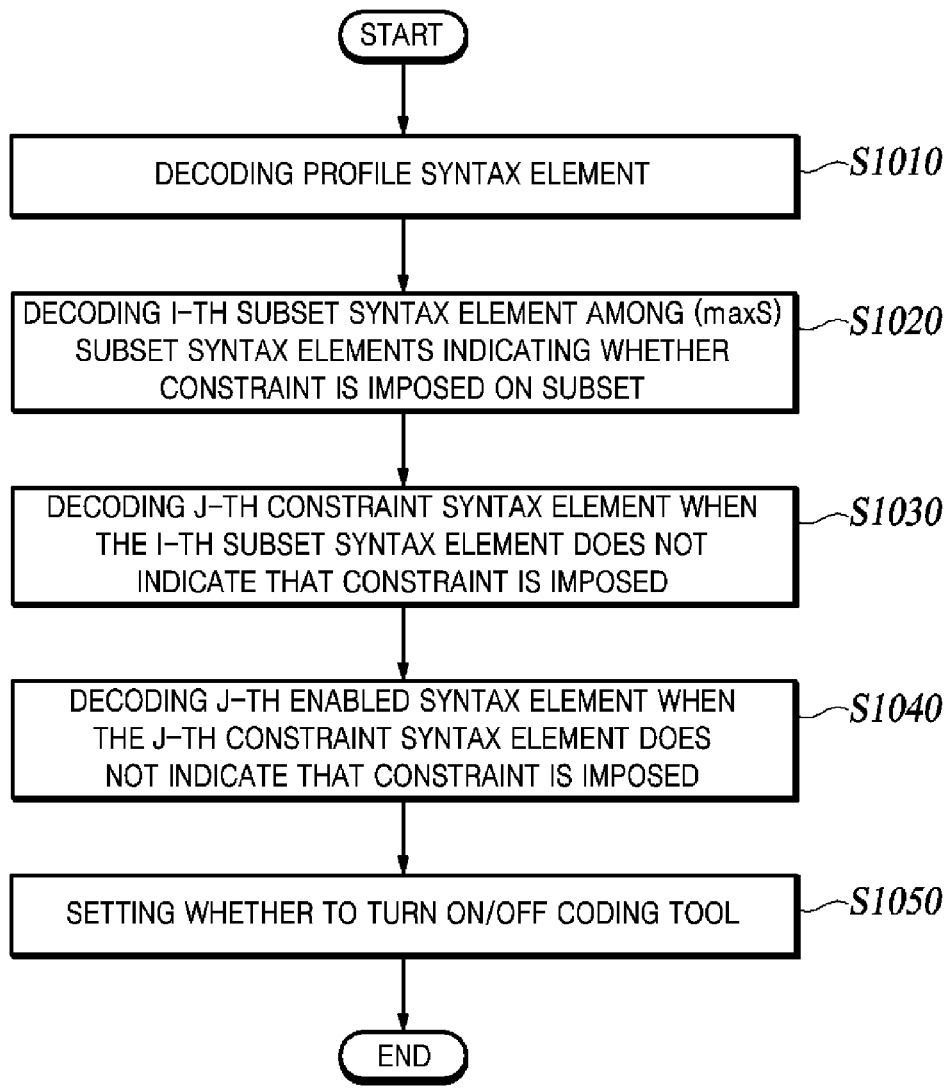
Figure 11:
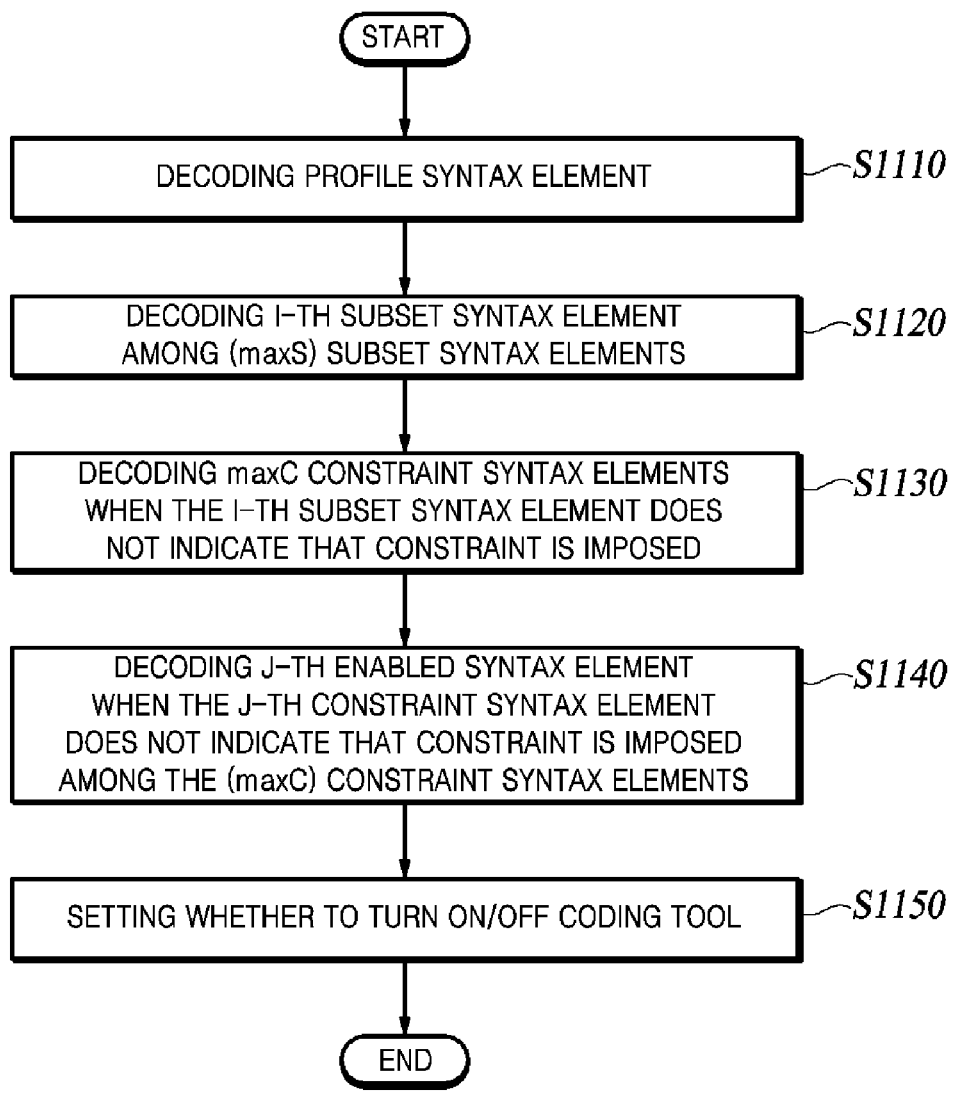
Figure 12:
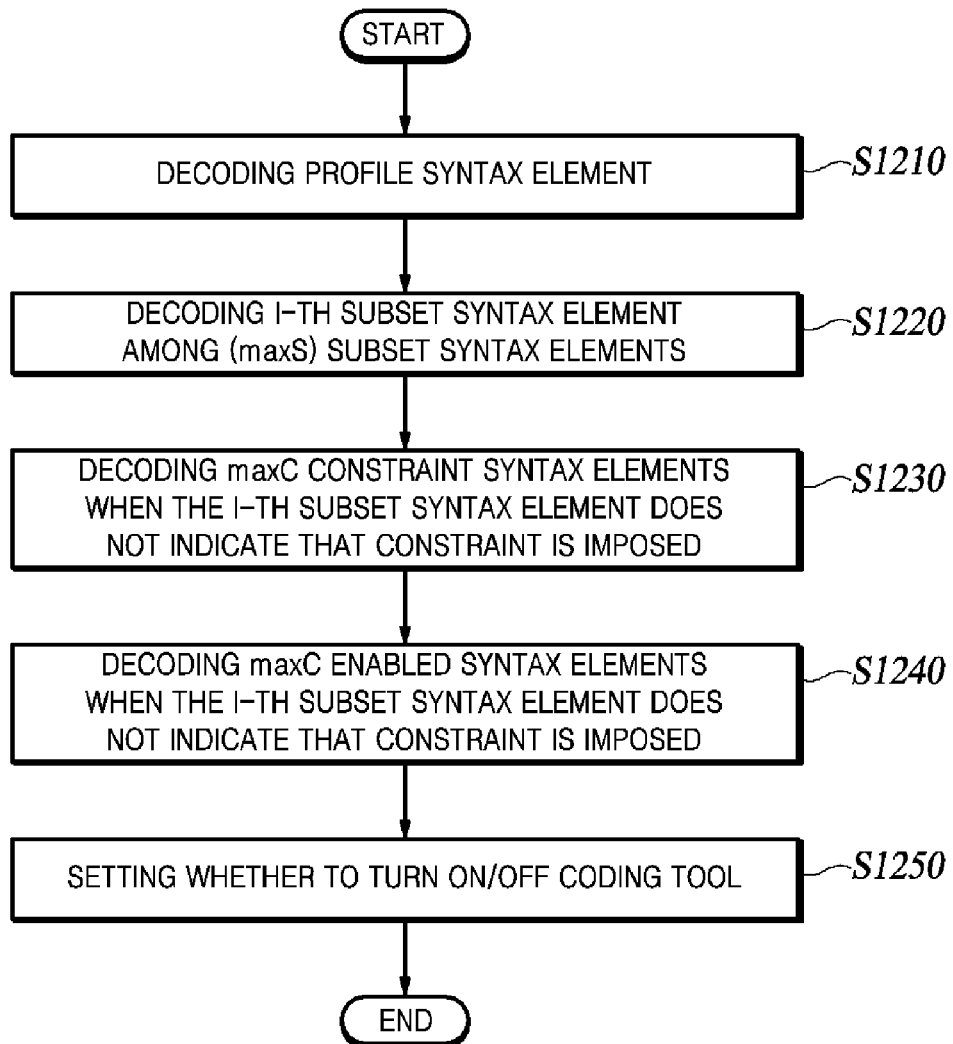

FIG. 4 is an exemplary functional block diagram of a video decoding apparatus capable of implementing the techniques of the present disclosure. Hereinafter, the video decoding apparatus and elements of the apparatus will be described with reference to FIG. 4.

The video decoding apparatus may include a decoder 410, an inverse quantizer 420, an inverse transformer 430, a predictor 440, an adder 450, a filter unit 460, and a memory 470.

Similar to the video encoding apparatus of FIG. 1, each element of the video decoding apparatus may be implemented as hardware or software, or may be implemented as a combination of hardware and software. In addition, the function of each element may be implemented as software, and a microprocessor may be implemented to execute the functions of software corresponding to each element.

The decoder 410 determines a current block to be decoded by decoding the bitstream received from the video encoding apparatus and extracting information related to block splitting, and extracts prediction information and information on residual signals necessary to reconstruct the current block.

The decoder 410 extracts information about the CTU size from the sequence parameter set (SPS) or the picture parameter set (PPS), determines the size of the CTU, and splits a picture into CTUs of the determined size. Then, the decoder determines the CTU as the uppermost layer, that is, the root node of a tree structure, and extracts splitting information about the CTU to split the CTU using the tree structure.

For example, when the CTU is split using the QTBTTT structure, a first flag (QT_split_flag) related to QT splitting is first extracted and each node is split into four nodes of a lower layer. Then, for a node corresponding to the leaf node of QT, a second flag (MTT_split_flag) related to MTT splitting and information on the splitting direction (vertical/horizontal) and/or splitting type (binary/ternary) are extracted, and the leaf node is split in the MTT structure. In this way, each node below the leaf node of the QT is recursively split in a BT or TT structure.

As another example, when a CTU is split using the QTBTTT structure, a CU split flag (split_cu_flag) indicating whether a CU is split is first extracted. If the corresponding block is split, a QT split flag (split_qt_flag) is extracted. When the splitting type is not QT but MTT, a flag (mtt_split_cu_vertical_flag) indicating the MTT splitting direction (vertical or horizontal) and/or a flag (mtt_split_cu_binary_flag) indicating the MTT splitting type (Binary or Ternary) is additionally extracted. In the splitting process, each node may be subjected to recursive QT splitting zero or more times, and then subjected to recursive MTT splitting zero or more times. For example, the CTU may be MTT-split immediately, or may only be QT-split multiple times.

As another example, when the CTU is split using the QTBT structure, the first flag (QT_split_flag) related to the QT spitting, and each node is split into four nodes of a lower layer. For a node corresponding to the leaf node of the QT, the split_flag indicating whether the node is further BT-split and splitting direction information are extracted.

Upon determining the current block to be decoded through tree structure splitting, the decoder 410 extracts information about a prediction type indicating whether the current block is subjected to intra-prediction or inter-prediction. When the prediction type information indicates intra-prediction, the decoder 410 extracts a syntax element for the intra-prediction information (intra-prediction mode) for the current block. When the prediction type information indicates inter-prediction, the decoder 410 extracts a syntax element for the inter-prediction information, that is, information indicating a motion vector and a reference picture referred to by the motion vector.

The decoder 410 extracts information about quantized transform coefficients of the current block as information about residual signals.

The inverse quantizer 420 inversely quantizes the quantized transform coefficients, and inversely transforms the inversely quantized transform coefficients from the frequency domain to the spatial domain to reconstruct residual signals to generate a residual block for the current block.

In addition, when the inverse transformer 430 inversely transforms only a partial region (sub-block) of a transform block, a flag (cu_sbt_flag) indicating that only a sub-block of the transform block has been transformed, and the direction information (vertical/horizontal) about the sub-block (cu_sbt_horizontal_flag) and/or sub-block location information (cu_sbt_pos_flag) are extracted. Then, residual signals are reconstructed by inversely transforming the transform coefficients of the sub-block from the frequency domain to the spatial domain. For the region that is not inversely transformed, the residual signal is filled with "0". Thereby, the final residual block for the current block is created.

The predictor 440 may include an intra-predictor 442 and an inter-predictor 444. The intra-predictor 442 is activated when the prediction type of the current block is intra-prediction, and the inter-predictor 444 is activated when the prediction type of the current block is inter-prediction.

The intra-predictor 442 determines an intra-prediction mode of the current block among a plurality of intra-prediction modes based on a syntax element for the intra-prediction mode extracted from the decoder 410, and predicts the current block based on the reference pixels around the current block according to the intra-prediction mode.

The inter-predictor 444 determines a motion vector of the current block and a reference picture referenced by the motion vector based on the syntax element for the intra-prediction mode extracted from the decoder 410, and predicts the current block based on the motion vector and the reference picture.

The adder 450 reconstructs the current block by adding the residual block output from the inverse transformer and the predicted block output from the inter-predictor or the intra-predictor. The pixels in the reconstructed current block are used as reference pixels for intra-prediction of a block to be decoded later.

The filter unit 460 may include a deblocking filter 462 and an SAO filter 464. The deblocking filter 462 performs deblocking filtering on the boundary between reconstructed blocks to remove blocking artifacts caused by block-by-block decoding. The SAO filter 464 performs additional filtering on a reconstructed block after deblocking filtering in order to compensate for a difference between the reconstructed pixel and the original pixel caused by lossy coding. The reconstructed block filtered through the deblocking filter 462 and the SAO filter 464 is stored in the memory 470. When all blocks in one picture are reconstructed, the reconstructed picture is used as a reference picture for inter-prediction of a block in a picture to be encoded thereafter.

Although not shown in FIG. 4, the video decoding apparatus may further include a control means to set whether to use coding tools for each profile, using one or more syntax elements. The control means may be implemented on the same physical element (processor, etc.) as that for the subordinate elements illustrated in FIG. 4, or may be implemented on a different physical element than that for the subordinate elements illustrated in FIG. 4. Details of the control means will be described later.

The control means included in the video decoding apparatus is an element corresponding to the above-described control means included in the video encoding apparatus in terms of function. Hereinafter, in order to easily distinguish between the control means included in the video decoding apparatus and the control means included in the video encoding apparatus, the control means included in the video decoding apparatus will be referred to as a decoding control means, and the control means included in the video encoding apparatus will be referred to as encoding control means.

Conventional standards such as HEVC have used concepts such as a profile, a level, and a tier in consideration of an application to which the standard technology is applied and the performance of the video decoding apparatus (decoder).

A profile refers to a set consisting of specific coding tools for a specific application (service) among multiple coding tools provided in the video standard. Profiles such as "Main profile," "Main10 profile," "Main still picture profile," "Format range extensions profiles," "High throughput profiles," and "Screen content coding extensions profiles" are established in HEVC. Here, the coding tools may refer to various functions provided by the video standard, such as a merge function, a cross-component prediction function, an adaptive motion vector resolution function, a transform skip function, a current picture referencing function, and a palette function.

A level is a concept used in consideration of a difference in processing performance that is produced according to the characteristics of the video decoding apparatus even when the same profile is used. The maximum resolution and frame rate of a video that can be processed may be determined according to the level value.

A tier, which is related to a restriction on the maximum bit rate, is a concept used because video is or is not compressed with high resolution and high quality depending on the application even at the same profile and the same level. That is, a tier is a regulation related to the memory 470 of the video decoding apparatus.

The levels and tiers of HEVC are summarized in Table 1 below.

In HEVC, syntax elements that designate a profile, a level, and a tier are also located in a video parameter set (VPS). The syntax elements located in the VPS are shown in Table 4 below.

TABLE 4

| | Descriptor |
|---|---|
| seq_parameter_set_rbsp( ) { | |
|   vps_video_parameter_set_id | u(4) |
|   vps_base_layer_internal_flag | u(1) |
| ... | |
|   profile_tier_level( 1, vps_max_sub_layers_minus1 ) | |

The VPS is header information used in encoding one content into multiple layers for scalable coding. In this case, profile information for a base layer and profile information for sub layers may be configured separately.

TABLE 1

| | | Max CPB size MaxCPB (CpbVclFactor or CpbNalFactor bits) | | Max slice segments per picture | Max # of tile rows | Max # of tile columns |
|---|---|---|---|---|---|---|
| | Max luma picture size | | | | | |
| Level | MaxLumaPs (samples) | Main tier | High Tier | MaxSliceSegmentsPerPicture | MaxTileRows | MaxTileCols |
| 1 | 36 864 | 350 | — | 16 | 1 | 1 |
| 2 | 122 880 | 1 500 | — | 16 | 1 | 1 |
| 2.1 | 245 760 | 3 000 | — | 20 | 1 | 1 |
| 3 | 552 960 | 6 000 | — | 30 | 2 | 2 |
| 3.1 | 983 040 | 10 000 | — | 40 | 3 | 3 |
| 4 | 2 228 224 | 12 000 | 30 000 | 75 | 5 | 5 |
| 4.1 | 2 228 224 | 20 000 | 50 000 | 75 | 5 | 5 |
| 5 | 8 912 896 | 25 000 | 100 000 | 200 | 11 | 10 |
| 5.1 | 8 912 896 | 40 000 | 160 000 | 200 | 11 | 10 |
| 5.2 | 8 912 896 | 60 000 | 240 000 | 200 | 11 | 10 |
| 6 | 35 651 584 | 60 000 | 240 000 | 600 | 22 | 20 |
| 6.1 | 35 651 584 | 120 000 | 480 000 | 600 | 22 | 20 |
| 6.2 | 35 651 584 | 240 000 | 800 000 | 600 | 22 | 20 |

In HEVC, syntax elements that designate a profile, a level, and a tier are located in a sequence parameter set (SPS). These syntax elements located in the SPS are shown in Tables 2 and 3 below.

TABLE 2

| | Descriptor |
|---|---|
| seq_parameter_set_rbsp( ) { | |
|   sps_video_parameter_set_id | u(4) |
|   sps_max_sub_layers_minus1 | u(3) |
|   sps_temporal_id_nesting_flag | u(1) |
|   profile_tier_level( 1, sps_max_sub_layers_minus1 ) | |

TABLE 3

| | Descriptor |
|---|---|
| profile_tier_level( profilePresentFlag, maxNumSubLayersMinus1 ) { | |
|   if( profilePresentFlag ) { | |
|     general_profile_space | u(2) |
|     general_tier_flag | u(1) |
|     general_profile_idc | u(5) |
|     for( j = 0; j < 32; j++ ) | |
|       general_profile_compatibility_flag[ j ] | u(1) |
|     ... | u(1) |
|   } | |
|   general_level_idc | u(8) |

In the HEVC standard, one profile value may be specified for one sequence. However, in order to provide compatibility for each profile, it may be indicated that the sequence is compatible with profiles other than the specified profile, and the compatibility may be indicated using the general_profile_compatibility_flag[j] syntax element.

For example, when a main profile is specified in one sequence, "1" is set in general_profile_idc, and also set in general_profile_compatibility_flag[1]. In this state, a value of "0" or "1" may be set in the general_profile_compatibility_flag[j] syntax element corresponding to a value of j other than index=1, depending on whether the sequence is compatible with other profiles. For example, when the sequence is compatible with the main 10 profile (index=2), a value of "1" may be set in general_profile_compatibility_flag [2] to indicate that the sequence is compatible.

As described above, in the conventional standard, one or more profiles that may be specified for or applied to a specific sequence may be presented by indicating compatibility. However, in the conventional standard, information on coding tools actually used for the corresponding sequence among multiple coding tools included in the specified profile cannot be indicated.

In the present specification, various embodiments are proposed in which information on coding tools actually used for a corresponding sequence among a plurality of coding tools may be presented separately for each profile.

The encoding control means may specify or present a profile to be applied to a specific sequence among one or more available profiles (hereinafter referred to as "all profiles") using a syntax element. The syntax element specifying the profile may be referred to as a profile syntax element (general_profile_idc, hereinafter briefly referred to as profile_idc), and a profile indicated by this profile syntax element (a profile to be applied) may be referred to as a target profile.

The encoding control means may specify or present coding tools applied to or used for a corresponding sequence among one or more coding tools included in the specified profile (target profile), using one or more syntax elements. The syntax element for specifying a coding tool may be referred to as a coding tool syntax element, and a coding tool included in the target profile may be referred to as a target coding tool.

The coding tool syntax element may be used to indicate whether to apply a coding tool (target coding tool) included in the target profile, or may be used to indicate whether to apply the entire coding tools including the target coding tool (hereinafter referred to as "all coding tools"). Here, all coding tools may mean all coding tools that may be included in all profiles, and whether to apply a coding tool may mean whether to restrict, use, disable, or turn on/off the coding tool.

The video encoding apparatus may signal a bitstream containing the profile syntax element and the coding tool syntax element to the video decoding apparatus. The profile syntax element and the coding tool syntax element may be signaled in one or more of a picture-level header, a sequence-level header, or a higher-level header (e.g., a decoder-level header, a decoding parameter set (DPS)). In addition, the profile syntax element and the coding tool syntax element may be located and signaled in the VPS for scalable coding.

The decoder 410 may decode the profile syntax element from the bitstream (S510) and decode the coding tool syntax element from the bitstream (S520).

The decoding control means may set whether to use the target coding tool included in the target profile among all coding tools based on the decoded coding tool syntax element (S530). Here, whether to use a coding tool may mean the on/off state of the coding tool, and setting whether to use a coding tool may mean turning on/off the coding tool.

By specifying a profile indicated by the profile syntax element as a target profile, target coding tools may be specified among all coding tools. By setting, to off, a target coding tool indicated by the coding tool syntax element that the target coding tool is not applied, and setting, to on, a target coding tool indicated by the coding tool syntax element that the target coding tool is applied, on/off of the target coding tools may be set.

Hereinafter, various embodiments proposed by the present disclosure will be described in detail.

For specific embodiments, four profiles (Profile-A, Profile-B, Profile-C, and Profile-D) are assumed in this specification. In addition, in this specification, three coding tools (tool-a, tool-b, and tool-c) are included in Profile-A, and five coding tools (tool-a, tool-c, tool-d, tool-e, and tool-g) are included in Profile-B. Three coding tools (tool-b, tool-d, and tool-f) are included in Profile-C, and four coding tools (tool-b, tool-c, tool-f, and tool-g) are included in Profile-D. The tools are summarized in Table 5 below.

TABLE 5

| Profile name | $1^{st}$ tool | $2^{nd}$ tool | $3^{rd}$ tool | $4^{th}$ tool | $5^{th}$ tool | ... | $max^{th}$ tool |
|---|---|---|---|---|---|---|---|
| Profile-A | tool-a | tool-b | tool-c | — | — | — | — |
| Profile-B | tool-a | tool-c | tool-d | tool-e | tool-g | — | — |
| Profile-C | tool-b | tool-d | tool-f | — | — | — | — |
| Profile-D | tool-b | tool-c | tool-f | tool-g | — | — | — |

In Table 5, "-" may denote that corresponding information is not present or that the information is not signaled. "max" may denote the number of entire configurable coding tools (the number of all coding tools). The meaning of "-" and the meaning of "max" are commonly applied throughout this specification. As shown in Table 5, coding tools included in a specific profile may be sequentially arranged. Accordingly, the j-th coding tool syntax element may indicate whether to apply the j-th coding tool. Here, j may correspond to an integer greater than or equal to 0.

Embodiment 1

Embodiment 1 is directed to a method of indicating whether to apply coding tools using two kinds of syntax elements. That is, in Embodiment 1, two different syntax elements may be employed as the coding tool syntax element.

One of the two kinds of syntax elements is a constraint syntax element indicating whether to impose a constraint on the coding tool, and the other is an enable syntax element indicating whether the coding tool is enabled. The constraint syntax element and the enabled syntax element may be defined at one or more of the picture-level header, the sequence-level header, the decoder-level header, or a higher-level header.

The constraint syntax element may indicate whether to impose a constraint on one or more target coding tools or all coding tools. The enabled syntax element may be used to indicate whether to enable the one or more target coding tools or all coding tools, or may be used to indicate whether to enable only coding tools for which the constraint syntax element indicates that the constraint is not imposed (the coding tools indicated not to be restricted by the constraint syntax element). Embodiment 1 may be classified into the following specific embodiments according to the scope of the coding tools indicated by the constraint syntax element and the enabled syntax element.

Embodiment 1-1

In Embodiment 1-1, the constraint syntax element may be set for all coding tools, and the enabled syntax element may be set for coding tools on which the constraint is not imposed by the constraint syntax element.

The video encoding apparatus may specify or designate a target profile using the profile syntax element, and indicate whether the constraint is imposed for each of all coding tools, using the constraint syntax element. In addition, the video encoding apparatus may indicate whether to enable coding tools on which the constraint is not imposed among all coding tools, using the enabled syntax element.

The syntax structure of this embodiment is shown in Table 6 below.

TABLE 6

| | Descriptor |
|---|---|
| profile_tier_level( ) { | |
|   profile_idc | |
|   for( j = 0; j < max ; j++ ) | |
|     coding_tool_constraint_flag[ j ] | u(1) |
| ... | |
|   for( j = 0; j < max ; j++ ) { | |
|     if ( ! coding_tool_constraint_flag[ j ] ) | |
|       coding_tool_enabled_flag[ j ] | u(1) |
|   } | |
| ... | |

As shown in Table 6, the constraint syntax element and the enabled syntax element may be signaled at the same position in one or more of the picture-level header, the sequence-level header, the decoder-level header, or the higher-level header. In an embodiment, the two syntax elements may be signaled at different positions, and the syntax structures therefor are shown in Tables 7 and 8 below.

TABLE 7

| | Descriptor |
|---|---|
| profile_tier_level( ) { | |
|   profile_idc | |
|   for( j = 0; j < max ; j++ ) | |
|     coding_tool_constraint_flag[ j ] | u(1) |
| ... | |

TABLE 8

| | Descriptor |
|---|---|
| seq_parameter_set_rbsp( ) { | |
|   profile_tier_level( ) | |
| ... | |
|   for( j = 0; j < max ; j++ ) { | |

TABLE 8-continued

| | Descriptor |
|---|---|
|     if ( ! coding_tool_constraint_flag[ j ] ) | |
|       coding_tool_enabled_flag[ j ] | u(1) |
|   } | |
| ... | |

In Tables 6 to 8, profile_idc represents a profile syntax element, coding_tool_constraint_flag[j] represents a constraint syntax element for the j-th coding tool, and coding_tool_enabled_flag [j] represents an enabled syntax element for the j-th coding tool. In an embodiment, the constraint syntax element and the enabled syntax element may be defined as flag values for each of all coding tools without using the array [j]. For example, A_constraint_flag and A_enabled_flag may be defined for the coding tool A, and B_constraint_flag and B_enabled_flag may be defined for coding tool B.

As shown in Tables 6 to 8, the video encoding apparatus may indicate a target profile to be specified for the corresponding sequence using profile_idc, may indicate whether to impose a constraint on the coding tools using coding_tool_constraint_flag[j] (for all coding tools) according to the max, and may indicate whether to enable coding tools on which the constraint is not imposed, using coding_tool_enabled_flag[j].

An example of applying the method of Embodiment 1-1 on the assumption of Table 5 is shown in Table 9 below.

TABLE 9

| profile_idc | Profile-A | Profile-B | Profile-C | Profile-D |
|---|---|---|---|---|
| coding_tool_constraint_flag[0] | tool-a: 0 | tool-a: 0 | tool-b: 0 | tool-b: 0 |
| coding_tool_constraint_flag[1] | tool-b: 0 | tool-c: 0 | tool-d: 1 | tool-c: 0 |
| coding_tool_constraint_flag[2] | tool-c: 0 | tool-d: 1 | tool-f: 0 | tool-f: 1 |
| coding_tool_constraint_flag[3] | 1 | tool-e: 1 | 1 | tool-g: 0 |
| coding_tool_constraint_flag[4] | 1 | tool-g: 0 | 1 | 1 |
| coding_tool_constraint_flag[5] | 1 | 1 | 1 | 1 |
| ... | | | | |
| coding_tool_constraint_flag[max−1] | 1 | 1 | 1 | 1 |
| ... | | | | |
| coding_tool_enabled_flag[0] | tool-a: 1 | tool-a: 1 | tool-b: 1 | tool-b: 1 |
| coding_tool_enabled_flag[1] | tool-b: 1 | tool-c: 1 | — | tool-c: 0 |
| coding_tool_enabled_flag[2] | tool-e: 0 | — | tool-f: 0 | — |
| coding_tool_enabled_flag[3] | — | — | — | tool-g: 1 |
| coding_tool_enabled_flag[4] | — | tool-g: 1 | — | — |
| coding_tool_enabled_flag[5] | — | — | — | — |
| ... | | | | |
| coding_tool_enabled_flag[max−1] | — | — | — | — |

In Table 9, coding_tool_constraint_flag[j]=0 indicates that the constraint is not imposed on the corresponding (j-th) coding tool. coding_tool_constraint_flag[j]=1 indicates that the constraint is imposed on the corresponding coding tool. coding_tool_enabled_flag[j]=0 indicates that the corresponding coding tool is not enabled. coding_tool_enabled_flag[j]=1 indicates that the corresponding coding tool is enabled.

As shown in Table 9, the constraint syntax element is set to "1," which indicates that the constraint is imposed, for a coding tool on which the constraint is imposed, and is set to "0," which indicates no constraint is imposed, for a coding tool on which the constraint is not imposed. In addition, the constraint syntax element is set to "1," which indicates that the constraint is imposed, for coding tools not included in the target profile (array elements at positions exceeding the number of coding tools included in the target profile).

For example, in the case of Profile-B, the constraint syntax element is set to "0" for tool-a (index 0), tool-c (index 1), and tool-g (index 4), on which the constraint is not imposed, among the target coding tools, is set to "1" for tool-d (index 2) and tool-e (index 3), on which the constraint is imposed, and is set to "1" for the coding tools (from index 5 to index max−1 in the array) which do not correspond to the target coding tools.

The enabled syntax element is set to "1," which indicates that a corresponding coding tool is enabled, for enabled coding tools among the coding tools on which the constraint is not imposed (coding_tool_constraint_flag[j]=0), and is set to "0," which indicates that a corresponding coding tool is not enabled, for the coding tools that are not enabled. For example, in the case of Profile-A, "1" is set for the array elements with indexes 0 and 1, which correspond to enabled coding tools, and "0" is set for the array element with index 2, which corresponds to a coding tool that is not enabled. Since the enabled syntax element is not set for the coding tools on which the constraint is imposed (coding_tool_constraint_flag[j]=1), the corresponding array elements may be marked as "-".

The video encoding apparatus may signal a bitstream containing the profile syntax element and the coding tool syntax elements (the constraint syntax element and the enabled syntax element) to the video decoding apparatus. The bitstream may contain as many constraint syntax elements as the max number and enabled syntax elements whose number is less than or equal to the max number (as many as the number of coding tools on which the constraint is not imposed).

The video decoding apparatus may decode the profile syntax element (S610). In addition, the video decoding apparatus may decode the constraint syntax elements for all coding tools (corresponding to the max number) (S620). For example, the video decoding apparatus may decode as many the constraint syntax elements as the max number by decoding a specific (j-th) constraint syntax element and decoding the next ((j++)-th) constraint syntax element when a part of the constraint syntax elements are not decoded.

The video decoding apparatus may decode the enabled syntax element when the constraint syntax element does not indicate that the constraint is imposed (S630). For example, the video decoding apparatus may decode the j-th enabled syntax element when the j-th constraint syntax element does not indicate that the constraint is imposed, and may determine the next ((j++)-th) constraint syntax element when the j-the constraint syntax element indicates that the constraint is imposed. Thereby, the video decoding apparatus may decode elements of enabled syntax elements (whose number is less than or equal to max).

The video decoding apparatus may set whether to turn on/off the target coding tool based on the constraint/enabled syntax elements (S640). Specifically, the video decoding apparatus may set coding tools for which the enabled syntax element indicates enabled to on, and set, to off, coding tools for which the constraint syntax element indicates that the constraint is imposed, or the enabled syntax element does not indicate enabled (or indicates disabled). Thereby, the video decoding apparatus may set whether to turn on/off the target coding tool.

Embodiment 1-2

In Embodiment 1-2, the constraint syntax element may be set for one or more coding tools, and the enabled syntax element may also be set for one or more coding tools. In addition, in Embodiment 1-2, after the constraint syntax element for the coding tools is first defined, the enabled syntax element for the coding tools may be defined.

The video encoding apparatus may specify a target profile using a profile syntax element, and set whether to impose a constraint on one or more coding tools (up to max coding tools) using the constraint syntax element. The video encoding apparatus may set whether to enable the one or more coding tools (up to max coding tools) using the enabled syntax element. That is, the enabled syntax element may be set for all coding tools regardless of whether the constraint is imposed by the constraint syntax element. When the constraint syntax element for one coding tool imposes a constraint on enabling of the coding tool, the enabled syntax element for the coding tool should be set to a value that does not indicate that the tool is enabled (a value indicating that the tool is not enabled). On the other hand, when the constraint syntax element does not impose a constraint on enabling of the coding tool, the enabled syntax element for the coding tool may be set to any value.

The syntax structure of this embodiment is shown in Table 10 below.

TABLE 10

| | Descriptor |
|---|---|
| profile_tier_level( ) {<br>  profile_idc<br>  for( j = 0; j < max ; j++ )<br>    coding_tool_constraint_flag[ j ]<br>  ...<br>  for( j = 0; j < max ; j++ )<br>    coding_tool_enabled_flag[ j ]<br>  ... | <br><br><br>u(1)<br><br><br>u(1) |

As shown in Table 10, the constraint syntax element and the enabled syntax element may be signaled at the same position in one or more of the picture-level header, the sequence-level header, the decoder-level header, or a higher-level header. In addition, the two syntax elements may be signaled at different positions, and the syntax structures therefor are shown in Tables 11 and 12 below.

TABLE 11

| | Descriptor |
|---|---|
| profile_tier_level( ) {<br>  profile_idc<br>  for( j = 0; j < max ; j++ )<br>    coding_tool_constraint_flag[ j ]<br>  ... | <br><br><br>u(1) |

TABLE 12

| | Descriptor |
|---|---|
| seq_parameter_set_rbsp( ) {<br>  profile_tier_level( )<br>  ...<br>  for( j = 0; j < max ; j++ )<br>    coding_tool_enabled_flag[ j ]<br>  ... | <br><br><br>u(1) |

In Tables 10 to 12, the meanings of profile_idc, coding_tool_constraint_flag[j], and coding_tool_enabled_flag[j] may be the same as those in Tables 6 to 8 mentioned above.

An example of applying the method of Embodiment 1-2 on the assumption of Table 5 is shown in Table 13 below.

TABLE 13

| profile_idc | Profile-A | Profile-B | Profile-C | Profile-D |
|---|---|---|---|---|
| coding_tool_constraint_flag[0] | tool-a: 0 | tool-a: 0 | tool-b: 0 | tool-b: 0 |
| coding_tool_constraint_flag[1] | tool-b: 0 | tool-c: 0 | tool-d: 1 | tool-c: 0 |
| coding_tool_constraint_flag[2] | tool-c: 0 | tool-d: 1 | tool-f: 0 | tool-f: 1 |
| coding_tool_constraint_flag[3] | 1 | tool-e: 1 | 1 | tool-g: 0 |
| coding_tool_constraint_flag[4] | 1 | tool-g: 0 | 1 | 1 |
| coding_tool_constraint_flag[5] | 1 | 1 | 1 | 1 |
| ... | | | | |
| coding_tool_constraint_flag[max−1] | 1 | 1 | 1 | 1 |
| ... | | | | |
| coding_tool_enabled_flag[0] | tool-a: 1 | tool-a: 1 | tool-b: 1 | tool-b: 1 |
| coding_tool_enabled_flag[1] | tool-b: 1 | tool-c: 1 | 0 | tool-c: 0 |
| coding_tool_enabled_flag[2] | tool-c: 0 | 0 | tool-f: 0 | 0 |
| coding_tool_enabled_flag[3] | 0 | 0 | 0 | tool-g: 1 |
| coding_tool_enabled_flag[4] | 0 | tool-g: 1 | 0 | 0 |
| coding_tool_enabled_flag[5] | 0 | 0 | 0 | 0 |
| ... | | | | |
| coding_tool_enabled_flag[max−1] | 0 | 0 | 0 | 0 |

As shown in Table 13, the constraint syntax element is set to "1," which indicates that the constraint is imposed, for a coding tool on which the constraint is imposed, and is set to "0," which indicates no constraint is imposed, for a coding tool on which the constraint is not imposed. Here, the constraint syntax element is set to "1," which indicates that the constraint is imposed, for coding tools not included in the target profile (array elements at positions exceeding the number of coding tools included in the target profile).

The enabled syntax element is set to "1," which indicates enabled, for an enabled coding tool among all coding tools, and is set to "0," which indicates disabled, for the coding tools that are not enabled. Here, the enabled syntax element should be set to "0" for the coding tool on which a constraint is imposed by the constraint syntax element.

For example, in the case of Profile-B, the enabled syntax element is set to "1" for tool-a (index 0), tool-c (index 1), and tool-g (index 4), on which the constraint is not imposed, among the target coding tools, and is set to "0" for tool-d (index 2) and tool-e (index 3), on which the constraint is imposed. Since the constraint is imposed on the coding tools (from index 5 to index max−1 in the array) which do not correspond to the target coding tools, the element is set to "0" for these tools.

The video encoding apparatus may signal a bitstream containing the profile syntax element and the coding tool syntax elements (the constraint syntax element and the enabled syntax element) to the video decoding apparatus. The bitstream may contain as many constraint syntax elements as the max number and enabled syntax elements whose number is less than or equal to the max number (as many as the number of coding tools on which the constraint is not imposed).

The video decoding apparatus may decode the profile syntax element (S710). In addition, the video decoding apparatus may decode the constraint syntax elements as many as the number of coding tools (up to max tools) (S720). Furthermore, the video decoding apparatus may decode the enabled syntax elements as many as the number of coding tools (up to max tools) regardless of whether the constraint syntax element indicates that the constraint is imposed (S730).

The video decoding apparatus may set whether to turn on/off the target coding tool based on the constraint/enabled syntax elements (S740). Specifically, the video decoding apparatus may set coding tools for which the constraint syntax element indicates that the constraint is not imposed and the enabled syntax element indicates enabled to on, and set, to off, coding tools for which the constraint syntax element indicates that the constraint is not imposed, or the enabled syntax element does not indicate enabled (or indicates disabled). Thereby, the video decoding apparatus may set whether to turn on/off the target coding tool.

Embodiment 1-3

Embodiments 1-3 is directed to a method of setting the constraint syntax element and/or the enabled syntax element only for the target coding tool included in the target profile, rather than setting the same for all coding tools.

As described above, the coding tools are sequentially arranged in a profile to which they belong. Accordingly, when the "max" is reset or reassigned to the number equal to the number of target coding tools, whether to impose a constraint and/or to enable the coding tools may be set only for the target coding tools. Redefinition of the "max" may be implemented through Equation 1 below.

$$\text{max} = \text{MaxofCodingTools}[\text{profile\_idc}] \qquad \text{[Equation 1]}$$

MaxofCodingTools[profile_idc] is an array indicating the number of coding tools (target coding tools) included in the i-th profile (profile_idc). Here, i may correspond to an integer greater than or equal to 0.

The syntax structure of this embodiment is shown in Table 14 below.

TABLE 14

| | Descriptor |
|---|---|
| profile_tier_level( ) { | |
|   profile_idc | |
|   max = MaxofCodingTools[ profile_idc ] | |
|   for( j = 0; j < max ; j++ ) | |
|     coding_tool_constraint_flag[ j ] | u(1) |
|   ... | |
|   for( j = 0; j < max ; j++ ) { | |
|     if ( ! coding_tool_constraint_flag[ j ] ) | |
|       coding_tool_enabled_flag[ j ] | u(1) |
|   } | |
|   ... | |

An example of applying the method of Embodiment 1-3 on the assumption of Table 5 is shown in Table 15 below.

TABLE 15

| profile_idc | Profile-A | Profile-B | Profile-C | Profile-D |
|---|---|---|---|---|
| coding_tool_constraint_flag[0] | tool-a: 0 | tool-a: 0 | tool-b: 0 | tool-b: 0 |
| coding_tool_constraint_flag[1] | tool-b: 0 | tool-c: 0 | tool-d: 1 | tool-c: 0 |
| coding_tool_constraint_flag[2] | tool-c: 0 | tool-d: 1 | tool-f: 0 | tool-f: 1 |
| coding_tool_constraint_flag[3] | — | tool-e: 1 | — | tool-g: 0 |
| coding_tool_constraint_flag[4] | — | tool-g: 0 | — | — |
| ... | | | | |
| coding_tool_enabled_flag[0] | tool-a: 1 | tool-a: 1 | tool-b: 1 | tool-b: 1 |
| coding_tool_enabled_flag[1] | tool-b: 1 | tool-c: 1 | — | tool-c: 0 |
| coding_tool_enabled_flag[2] | tool-c: 0 | — | tool-f: 0 | — |
| coding_tool_enabled_flag[3] | — | — | — | tool-g: 1 |
| coding_tool_enabled_flag[4] | — | tool-g: 1 | — | — |

As shown in Table 15, when whether to impose a constraint on the coding tools is indicated using the same number of constraint syntax elements as the reset max, whether to impose the constraint may be indicated only for the target coding tools included in the target profile. In addition, by indicating whether the coding tools are enabled using the same number of enabled syntax elements as the reset max, whether to enable only the target coding tools included in the target profile may be indicated. For example, in the case of Profile-B, whether to impose the constraint may be indicated only for the five coding tools (tool-a, tool-c, tool-d, tool-e, and tool-g), and the enabling status may be indicated only for the coding tools (tool-a, tool-c, and tool-g) on which the constraint is not imposed among the five coding tools.

In the case of this embodiment, the video decoding apparatus may decode the constraint syntax elements as many as the reset max (the same number as the target coding tools), and decode the enabled syntax elements as many as the number of coding tools on which the constraint is not imposed. Also, the video decoding apparatus may set whether to turn on/off the target coding tools included in the target profile based on the constraint syntax elements and the enabled syntax elements.

The embodiment described based on Table 15 is an example in which the enabled syntax element is set only for coding tools on which the constraints is not imposed by the constraint syntax element (in combination with Embodiment 1-1). As described above, the enabled syntax element may be set for all coding tools regardless of whether the constraint is imposed by the constraint syntax element (in combination with Embodiment 1-2). An example combined with Embodiment 1-2 is shown in Table 16 below.

As shown in Table 16, the enabled syntax elements may be set as many as the value of the reset max, and may indicate whether to enable all the target coding tools included in the target profile regardless of whether the constraint is imposed. Here, the enabled syntax element may be set to "0" for coding tools on which the constraint is imposed by the constraint syntax element among the coding tools included in the target profile. For example, in the case of Profile-B, whether to impose the constraint may be indicated only for five coding tools (tool-a, tool-c, tool-d, tool-e, and tool-g), and the enabled syntax element may be set to "0" for the coding tools (tool-d and tool-e) on which the constraint is imposed by the constraint syntax element among the five coding tools.

In this embodiment, the video decoding apparatus may decode the constraint syntax elements and the enabled syntax elements as many as the reset max (the number of target coding tools). Also, the video decoding apparatus may set whether to turn on/off target coding tools included in the target profile based on the constraint syntax elements and the enabled syntax elements.

Embodiment 2

Embodiment 2 is directed to a method of indicating whether to apply target coding tools using one syntax element. This syntax element is a disable syntax element indicating whether to disable a coding tool. Whether to disable the coding tool may imply whether to impose a constraint on the coding tool or whether to enable the coding tool. The disable syntax element may be included in the coding tool syntax element, and may be defined in one or more of the sequence-level header, the decoder-level header, or a higher-level header.

The disable syntax element may indicate the disabled status for all coding tools or only for the target coding tools.

TABLE 16

| profile_idc | Profile-A | Profile-B | Profile-C | Profile-D |
|---|---|---|---|---|
| coding_tool_constraint_flag[0] | tool-a: 0 | tool-a: 0 | tool-b: 0 | tool-b: 0 |
| coding_tool_constraint_flag[1] | tool-b: 0 | tool-c: 0 | tool-d: 1 | tool-c: 0 |
| coding_tool_constraint_flag[2] | tool-c: 0 | tool-d: 1 | tool-f: 0 | tool-f: 1 |
| coding_tool_constraint_flag[3] | — | tool-e: 1 | — | tool-g: 0 |
| coding_tool_constraint_flag[4] | — | tool-g: 0 | — | — |
| ... | | | | |
| coding_tool_enabled_flag[0] | tool-a: 1 | tool-a: 1 | tool-b: 1 | tool-b: 1 |
| coding_tool_enabled_flag[1] | tool-b: 1 | tool-c: 1 | 0 | tool-c: 0 |
| coding_tool_enabled_flag[2] | tool-c: 0 | 0 | tool-f: 0 | 0 |
| coding_tool_enabled_flag[3] | — | 0 | — | tool-g: 1 |
| coding_tool_enabled_flag[4] | — | tool-g: 1 | — | — |

Embodiment 2 may be divided into the following embodiments according to the scope of coding tools indicated by the disable syntax element.

Embodiment 2-1

Embodiment 2-1 is directed to a method of indicating the disabled status for all coding tools using the disable syntax element. The video encoding apparatus may specify a target profile using the profile syntax element, and indicate the disabled status for all coding tools (the max number of coding tools) using the disable syntax element.

The syntax structure of this embodiment is shown in Table 17 below.

TABLE 17

|  | Descriptor |
|---|---|
| profile_tier_level( ) {<br>  profile_idc<br>  for( j = 0; j < max ; j++ )<br>    coding_tool_disabled_flag[ j ]<br>... | <br><br><br>u(1) | coding_tool_disabled_flag[j] represents the disable syntax element. coding_tool_disabled_flag[j]1=1 may indicate that the corresponding coding tool (the j-th coding tool) is disabled (subjected to the constraint or not enabled), and coding_tool_disabled_flag[j]=0 indicates that the corresponding coding tool is enabled (used or not subjected to the constraint).

An example of applying the method of Example 2-1 on the assumption of Table 5 is shown in Table 18 below.

TABLE 18

| profile_idc | Profile-A | Profile-B | Profile-C | Profile-D |
|---|---|---|---|---|
| coding_tool_disabled_flag[0] | tool-a: 0 | tool-a: 0 | tool-b: 0 | tool-b: 0 |
| coding_tool_disabled_flag[1] | tool-b: 0 | tool-c: 0 | tool-d: 1 | tool-c: 1 |
| coding_tool_disabled_flag[2] | tool-c: 0 | tool-d: 1 | tool-f: 1 | tool-f: 1 |
| coding_tool_disabled_flag[3] | 1 | tool-e: 1 | 1 | tool-g: 0 |
| coding_tool_disabled_flag[4] | 1 | tool-g: 0 | 1 | 1 |
| coding_tool_disabled_flag[5] | 1 | 1 | 1 | 1 |
| ... | | | | |
| coding_tool_disabled_flag[max−1] | 1 | 1 | 1 | 1 |

As shown in Table 18, the video encoding apparatus may set whether to disable each of all coding tools by using the disable syntax element. That is, disable syntax elements as many as the max number may be set. The disable syntax element may be set to "1," which indicates disabled, for coding tools that are not used among the target coding tools, and may be set to "0," which indicates enabled, for the coding tools that are used. In addition, the disable syntax element may be set to "1," which indicates disabled, for the coding tools other than the target coding tools (array elements at positions exceeding the number of coding tools included in the target profile).

For example, in the case of Profile-B, the disable syntax element may be set to "1" for two coding tools (tool-d and tool-e) that are not applied among the five target coding tools, and may be set to "0" for the remaining coding tools (tool-a, tool-c, and tool-g) that are applied. The disable syntax element may be set to "1" for the coding tools (array elements from index 5 to index (max−1)) except the target coding tools.

The video encoding apparatus may signal a bitstream containing the profile syntax element and the coding tool syntax element (the disable syntax elements) to the video decoding apparatus. The bitstream may contain as many disable syntax elements as the max number.

The video decoding apparatus may decode the profile syntax element (S810). In addition, the video decoding apparatus may decode the disable syntax elements as many as the number of all coding tools (max number) (S820).

The video decoding apparatus may set whether to turn on/off the target coding tools based on the decoded disable syntax element (S830). Specifically, the video decoding apparatus may set whether to turn on/off the target coding tools by setting the coding tools for which the disable syntax element does not indicate disabled to on, and setting the coding tools for which the disable syntax element indicates disabled to off.

Embodiment 2-2

Embodiment 2-2 is directed to a method of presenting the disable syntax element only for target coding tools included in the target profile, not for all coding tools.

When max is reset or reassigned to the number equal to the number of target coding tools, the disabled status may be set only for the target coding tools. Redefinition of max may be implemented through Equation 1.

The encoding control means may specify a target profile using the profile syntax element, and reset max to be equal to the number of target coding tools included in the target profile. The encoding control means may set the number of disable syntax elements as many as the reset max.

The syntax structure of this embodiment is shown in Table 19 below.

TABLE 19

|  | Descriptor |
|---|---|
| profile_tier_level( ) {<br>  profile_idc<br>  max = MaxofCodingTools[ profile_idc ]<br>  for( j = 0; j < max ; j++ )<br>    coding_tool_disabled_flag[ j ]<br>... | <br><br><br><br>u(1) |

An example of applying the method of Embodiment 2-2 on the assumption of Table 5 is shown in Table 20 below.

TABLE 20

| profile_idc | Profile-A | Profile-B | Profile-C | Profile-D |
|---|---|---|---|---|
| coding_tool_disabled_flag[0] | tool-a: 0 | tool-a: 0 | tool-b: 0 | tool-b: 0 |
| coding_tool_disabled_flag[1] | tool-b: 0 | tool-c: 0 | tool-d: 1 | tool-c: 1 |
| coding_tool_disabled_flag[2] | tool-c: 0 | tool-d: 1 | tool-f: 1 | tool-f: 1 |
| coding_tool_disabled_flag[3] | — | tool-e: 1 | — | tool-g: 0 |
| coding_tool_disabled_flag[4] | — | tool-g: 0 | — | — |

As shown in Table 20, when disable syntax elements as many as the reset max are set, the disabled status may be indicated only for the target coding tools. For example, in the case of Profile-B, the disabled status may be indicated only for five coding tools (tool-a, tool-c, tool-d, tool-e, and tool-g). The disable syntax element may not be set for coding tools not included in the target coding tools.

In this embodiment, the video decoding apparatus may decode disable syntax elements as many as the number equal to the reset max (the number of the target coding tools). Also, the video decoding apparatus may set whether to turn on/off the target coding tools included in the target profile based on the disable syntax elements.

Embodiment 3

Embodiment 3 is directed to a method of setting whether to turn on/off coding tools by dividing the coding tools included in a profile into one or more subsets and separately indicating whether to impose a constraint on the subsets.

Definition of Subset

A subset may be understood as a subset of coding tools or a group of coding tools. Coding tools with similar functions may be included in the same subset. All available profiles (hereinafter referred to as "all profiles") may include one or more subsets, and each of the subsets may include one or more coding tools.

The subsets may be defined or organized in a variety of ways. For example, the subsets may be 1) defined based on all coding tools irrespective of the profiles, or 2) defined based on the coding tools included in a profile.

Regarding the subset definition 1), an example of defining subsets based on all coding tools is shown in Table 21 below.

TABLE 21

| Subset name | $1^{st}$ tool | $2^{nd}$ tool | $3^{rd}$ tool | $4^{th}$ tool | $5^{th}$ tool | ... | $max^{th}$ tool |
|---|---|---|---|---|---|---|---|
| Subset-α | tool-a | tool-b | — | — | — | | |
| Subset-β | tool-c | tool-d | — | — | — | | |
| Subset-γ | tool-e | tool-f | tool-g | — | — | | |
| ... | | | | | | | |
| Subset-maxS | tool-l | tool-m | tool-n | tool-o | — | | — |

In Table 21, maxS denotes the number of all subsets (hereinafter referred to as "all subsets") that may be determined or specified, and maxC denotes the maximum number of all coding tools that may be included (or set) in each subset.

An example of applying the subset definition 1) on the assumption of Table 5 is shown in Table 22 below.

TABLE 22

| Profile name | $1^{st}$ tool | $2^{nd}$ tool | $3^{rd}$ tool | $4^{th}$ tool | $5^{th}$ tool | ... | $max^{th}$ tool |
|---|---|---|---|---|---|---|---|
| Profile-A | Subset-α | | Subset-β | — | — | — | — |
| | tool-a | tool-b | tool-c | — | — | — | — |
| Profile-B | Subset-α | Subset-β | | Subset-γ | | — | — |
| | tool-a | tool-c | tool-d | tool-e | tool-g | — | — |
| Profile-C | Subset-α | Subset-β | Subset-γ | — | — | — | — |
| | tool-b | tool-d | tool-f | — | — | — | — |
| Profile-D | Subset-α | Subset-β | Subset-γ | | — | — | — |
| | tool-b | tool-c | tool-f | tool-g | — | — | — |

As shown in Table 22, Profile-A may include two subsets (Subset-α and Subset-β). Two coding tools (tool-a and tool-b) may be included in Subset-α, and one coding tool (tool-c) may be included in Subset-β. Profile-B may include three subsets (Subset-α, Subset-β, and Subset-γ). One coding tool (tool-a) may be included in Subset-α, and two coding tools (tool-c and tool-d) may be included in Subset-β, and two coding tools (tool-e and tool-g) may be included in Subset-γ.

The subset definition 2) is a method of defining subsets based on the coding tools included in a profile. An example of applying the subset definition 2) on the assumption of Table 5 is shown in Table 23 below.

TABLE 23

| Profile name | 1st tool | 2nd tool | 3rd tool | 4th tool | 5th tool | ... | max$^{th}$ tool |
|---|---|---|---|---|---|---|---|
| Profile-A | Subset-A1 | | Subset-A2 | — | — | — | — |
| | tool-a | tool-b | tool-c | | | | |
| Profile-B | Subset-B1 | | | Subset-B2 | | | |
| | tool-a | tool-c | tool-d | tool-e | tool-g | — | — |
| Profile-C | Subset-C1 | | | — | — | — | — |
| | tool-b | tool-d | tool-f | | | | |
| Profile-D | Subset-D1 | | Subset-D2 | | | | |
| | tool-b | tool-c | tool-f | tool-g | — | — | — |

As shown in Table 23, Profile-A may include two subsets (Subset-A1 and Subset-A2). Two coding tools (tool-a and tool-b) may be included in Subset-A1, and one coding tool (tool-c) may be included in Subset-A2. In addition, Profile-B may include two subsets (Subset-B1 and Subset-B2). Two coding tools (tool-a and tool-c) may be included in Subset-B1, and three Coding tools (tool-d, tool-e, and tool-g) may be included in Subset-B2. As such, a subset according to definition 2) may be defined as a subset of coding tools included in a profile to which the subset belongs.

When subsets are defined as shown in Table 22 or 23, the video encoding apparatus may specify a target profile using the profile syntax element, and determine or set whether to impose a constraint on the subsets using the subset syntax element. Here, the subset syntax element may be set for all subsets (as many as maxS). Hereinafter, a subset on which the constraint is not imposed by the subset syntax element will be referred to as a target subset.

The video encoding apparatus may set whether to apply coding tools, using a coding tool syntax element. The coding tool syntax element may indicate whether coding tools included in a subset on which the constraint is not imposed by the subset syntax element are applied, and the coding tools included in the subset on which the constraint is not imposed may correspond to target coding tools.

The video encoding apparatus may signal a bitstream containing the profile syntax element, the subset syntax element, and the coding tool syntax element to the video decoding apparatus.

The video decoding apparatus may decode the profile syntax element and the subset syntax element from the bitstream (S910 and S920). The subset syntax elements as many as masS may be decoded. Also, the video decoding apparatus may decode the coding tool syntax element when the subset syntax element does not indicate that the constraint is imposed (S930).

Upon completing decoding of the coding tool syntax element, the video decoding apparatus may set whether to turn on/off the target coding tools by setting whether to turn on/off the coding tools based on the coding tool syntax element (S940). Specifically, the video decoding apparatus may set target coding tools indicated as being applied by the coding tool syntax element to on, and set target coding tools not indicated as being applied by the coding tool syntax element to off, thereby setting whether to turn on/off the target coding tools.

Embodiment 3 may be divided into the following specific embodiments according to the scope of subsets for which the subset syntax element indicates whether the constraint is imposed, and the scope of coding tools for which the coding tool syntax element indicates whether the tools are applied.

Embodiment 3-1

Embodiment 3-1 is directed to a method of setting a subset syntax element for all subsets, setting a constraint syntax element when a constraint is not imposed on a subset, and setting an enabled syntax element when a constraint is not imposed on a coding tool.

An example of the syntax structure of this embodiment is shown in Table 24 below.

TABLE 24

| | Descriptor |
|---|---|
| profile_tier_level( ) { | |
|   profile_idc | |
|   for( i = 0; i < maxS ; i++ ) { | |
|     subset_constraint_flag[ i ] | u(1) |
|     if ( ! subset_constraint_flag[ i ] ) { | |
|       for( j = 0; j < maxC ; j++ ) { | |
|         coding_tool_constraint_flag[ j ] | u(1) |
|         if ( ! coding_tool_constraint_flag[ j ] ) | |
|           coding_tool_enabled_flag[ j ] | u(1) |
|       } | |
|     } | |
|   } | |
| ... | |

When the target profile is specified by the profile syntax element (profile_idc), the video encoding apparatus may set whether to impose the constraint on all (maxS) subsets using the subset syntax element (e.g., subset_constraint_flag[i]), thereby indicating whether to impose the constraint on the target subsets included in the target profile.

The video encoding apparatus may set whether to impose the constraint on the target coding tools and whether to enable the same, using the constraint syntax element and the enabled syntax element. Here, the constraint syntax element may be set when the constraint is not imposed on the subsets by the subset syntax element, and may be set for all coding tools. The enabled syntax element may be set for a coding tool on the constraint is not imposed by the constraint syntax element.

The method of Embodiment 3-1 may be applied to both subset definitions 1) and 2). An example of applying the method of Embodiment 3-1 to subset definition 2) is shown in Table 25 below.

TABLE 25

| profile_idc | Profile-A | Profile-B | Profile-C | Profile-D |
|---|---|---|---|---|
| subset_constraint_flag[0] | subset-A1: 0 | subset-B1: 1 | subset-C1: 0 | subset-D1: 0 |
| coding_tool_constraint_flag[0] | tool-a: 0 | — | tool-b: 0 | tool-b: 0 |
| coding_tool_enabled_flag[0] | tool-a: 1 | — | tool-b: 1 | tool-b: 1 |
| coding_tool_constraint_flag[1] | tool-b: 0 | — | tool-d: 0 | tool-c: 0 |
| coding_tool_enabled_flag[1] | tool-b: 0 | — | tool-d: 1 | tool-c: 1 |
| coding_tool_constraint_flag[2] | 1 | — | tool-f: 1 | 1 |
| coding_tool_enabled_flag[2] | — | — | — | — |
| coding_tool_constraint_flag[3] | 1 | — | 1 | 1 |
| ... | | | | |
| coding_tool_constraint_flag[maxC−1] | 1 | — | 1 | 1 |
| subset_constraint_flag[1] | subset-A2: 0 | subset-B2: 0 | 1 | subset-D2: 0 |
| coding_tool_constraint_flag[0] | tool-c: 0 | tool-d: 0 | — | tool-f: 0 |
| coding_tool_enabled_flag[0] | tool-c: 1 | tool-d: 1 | — | tool-f: 1 |
| coding_tool_constraint_flag[1] | 1 | tool-e: 1 | — | tool-g: 0 |
| coding_tool_enabled_flag[1] | — | — | — | tool-g: 1 |
| coding_tool_constraint_flag[2] | 1 | tool-g: 0 | — | 1 |
| coding_tool_enabled_flag[2] | — | tool-g: 1 | — | — |
| coding_tool_constraint_flag[3] | 1 | 1 | — | 1 |
| ... | | | | |
| coding_tool_constraint_flag[maxC−1] | 1 | 1 | — | 1 |
| subset_constraint_flag[2] | 1 | 1 | 1 | 1 |
| ... | | | | |
| subset_constraint_flag[maxS−1] | 1 | 1 | 1 | 1 |

As shown in Table 25, the subset syntax element may be set to "1" (subset_constraint_flag[i]=1) for a subset on which the constraint is imposed, and may be set to "0" (subset_constraint_flag[i]=0) for a subset on which the constraint is not imposed. The constraint syntax element may be set to "1" (coding_tool_constraint_flag[j]=1) for coding tools on which the constraint is imposed, and may be set to "0" (coding_tool_constraint_flag[j]=0) for coding tools on which the constraint is not imposed. The enabled syntax element is set to "0" (coding_tool_enabled_flag[j]=0) for coding tools that are not enabled, and is set to "1" for coding tools that are enabled, while not being set for coding tools on which the constraint is imposed.

For example, in the case of Profile-B, the constraint is imposed on the first subset (Subset-β1) (subset_constraint_flag[0]=1), and thus neither the constraint syntax element nor the enabled syntax element is set. The constraint is not imposed on the second subset (Subset-β2) (subset_constraint_flag[1]=0), and thus the constraint syntax element and the enabled syntax element may be set. The constraint syntax element may be set to indicate that the constraint is not imposed (coding_tool_constraint_flag[j]=0) for tool-d and tool-g among the coding tools (tool-d, tool-e, and tool-g) included in the second subset (Subset-β2), and may be set to indicate that the constraint is imposed (coding_tool_constraint_flag[j]=1) for tool-e. The enabled syntax element may be set to indicate enabled (coding_tool_enabled_flag[j]=1) for tool-d and tool-g on which the constraint is not imposed, and is not set for tool-e on which the constraint is imposed.

In summary of the results of Table 25, in the case of Profile-A, only tool-a and tool-c are enabled among the three coding tools (tool-a, tool-b, and tool-c). In the case of Profile-B, only tool-d and tool-g are enabled among the five coding tools (tool-a, tool-c, tool-d, tool-e, and tool-g). In the case of Profile-C, only tool-b and tool-d are enabled among the three coding tools (tool-b, tool-d, and tool-f). In the case of Profile-D, all the four coding tools (tool-b, tool-c, tool-f, and tool-g) are enabled.

The video encoding apparatus may signal a bitstream containing the profile syntax element, the subset syntax element, and the coding tool syntax elements (the constraint syntax element and the enabled syntax element) to the video decoding apparatus. The bitstream may contain maxS subset syntax elements, maxC constraint syntax elements, and maxC enabled syntax elements.

The video decoding apparatus may decode the profile syntax element (S1010) and decode a specific (i-th) subset syntax element among the maxS subset syntax elements (S1020). When the i-th subset syntax element does not indicate that the constraint is imposed, the video decoding apparatus may decode a specific (j-th) constraint syntax element among the maxC constraint syntax elements (S1030). When the j-th constraint syntax element does not indicate that the constraint is imposed, the video decoding apparatus may decode the j-th enabled syntax element (S1040).

The video decoding apparatus may decode all the constraint syntax elements and all enabled syntax elements for the i-th subset by repeatedly performing operations S1030 and S1040 while sequentially increasing j. Also, the video decoding apparatus may decode all the constraint syntax elements and all the enabled syntax elements for all subsets by repeatedly performing operations S1030 and S1040 while sequentially increasing i.

The video decoding apparatus may set whether to turn on/off the target coding tools based on the constraint/enabled syntax elements (S1050).

Embodiment 3-2

Embodiment 3-1 described above corresponds to a method of sequentially setting the j-th constraint syntax element and the j-th enabled syntax element for a specific (j-th) coding tool. In contrast, Embodiment 3-2 corresponds to a method of setting the enabled syntax elements after setting maxC constraint syntax elements.

An example of the syntax structure of Embodiment 3-2 is shown in Table 26 below.

TABLE 26

| | Descriptor |
|---|---|
| profile_tier_level( ) { | |
|   profile_idc | |
|   for( i = 0; i < maxS ; i++ ) { | |
|     subset_constraint_flag[ i ] | u(1) |
|     if ( ! subset_constraint_flag[ i ] ) { | |
|       for( j = 0; j < maxC ; j++) | |
|         coding_tool_constraint_flag[ j ] | u(1) |
|     } | |
|   } | |
|   ... | |
|   for( i = 0; i < maxS ; i++ ) { | |
|     if( ! subset_constraint_flag[ i ] ) { | |
|       for( j = 0; j < maxC ; j++ ) { | |
|         if( ! coding_tool_constraint_flag[ j ] ) | |
|           coding_tool_enabled_flag[ j ] | u(1) |
|       } | |
|     } | |
|   } | |
|   ... | |

Once a target profile is specified by the profile syntax element (profile_idc), the video encoding apparatus may set whether to impose a constraint on the target subsets using a subset syntax element (e.g., subset_constraint_flag[i]). The subset syntax element may be set for all (maxS) subsets.

The video encoding apparatus may set whether to impose a constraint on the target coding tools and whether to enable the same, using the constraint syntax element and the enabled syntax element. Here, the constraint syntax element may be set when the constraint is not imposed on the subset by the subset syntax element, and may be set for all (maxC) coding tools. The enabled syntax element may be set after the constraint syntax elements are set as many as maxC, and may be set for coding tools on which the constraint is not imposed by the constraint syntax element.

The method of Embodiment 3-2 may be applied to both subset definitions 1) and 2). An example of applying the method of Embodiment 3-2 to the subset definition 2) is shown in Table 27 below.

(subset_constraint_flag[i]=0) for a subset on which the constraint is not imposed. The constraint syntax element may be set to "1" (coding_tool_constraint_flag[j]=1) for coding tools on which the constraint is imposed, and may be set to "0" (coding_tool_constraint_flag[j]=0) for coding tools on which the constraint is not imposed. Although not shown in Table 27, the enabled syntax element is set to "0" (coding_tool_enabled_flag[j]=0) for coding tools that are not enabled, and is set to "1" for coding tools that are enabled, while not being set for coding tools on which the constraint is imposed.

For example, in the case of Profile-B, the constraint is imposed on the first subset (Subset-α) (subset_constraint_flag[0]=1), and thus neither the constraint syntax element nor the enabled syntax element is set. The constraint is not imposed on the second subset (Subset-β) (subset_constraint_ flag[1]=0), and thus the constraint syntax element and the enabled syntax element may be set. The constraint is not imposed on the third subset (Subset-γ), and thus the constraint syntax element and the enabled syntax element may be set.

In this embodiment, the bitstream may contain maxS subset syntax elements, maxC constraint syntax elements, and maxC enabled syntax elements.

The video decoding apparatus may decode the profile syntax element (S1110) and decode a specific (i-th) subset syntax element among the maxS subset syntax elements (S1120). When the i-th subset syntax element does not indicate that the constraint is imposed, the video decoding apparatus may decode maxC constraint syntax elements (S1130). The video decoding apparatus may decode all constraint syntax elements for all subsets while sequentially increasing i.

The video decoding apparatus may decode the j-th enabled syntax element the j-the constraint syntax element does not indicate that the constraint is imposed (S1140). The video decoding apparatus may decode all the enabled syntax elements for the i-th subset while sequentially increasing j. Also, the video decoding apparatus may decode all enabled syntax elements for all subsets while sequentially increasing i.

TABLE 27

| profile_idc | Profile-A | Profile-B | Profile-C | Profile-D |
|---|---|---|---|---|
| subset_constraint_flag[0] | subset-α: 0 | subset-α: 1 | subset-α: 0 | subset-α: 0 |
| coding_tool_constraint_flag[0] | tool-a: 0 | — | tool-b: 0 | tool-b: 0 |
| coding_tool_constraint_flag[1] | tool-b: 0 | — | 1 | 1 |
| coding_tool_constraint_flag[2] | 1 | — | 1 | 1 |
| ... | | | | |
| coding_tool_constraint_flag[maxC−1] | 1 | — | 1 | 1 |
| subset_constraint_flag[1] | subset-β: 0 | subset-β: 0 | subset-β: 0 | subset-β: 0 |
| coding_tool_constraint_flag[0] | tool-c: 0 | tool-c: 0 | tool-d: 0 | tool-c: 0 |
| coding_tool_constraint_flag[1] | 1 | tool-d: 1 | 1 | 1 |
| coding_tool_constraint_flag[2] | 1 | 1 | 1 | 1 |
| ... | | | | |
| coding_tool_constraint_flag[maxC−1] | 1 | 1 | 1 | 1 |
| subset_constraint_flag[2] | 1 | subset-γ: 0 | subset-γ: 0 | 1 |
| coding_tool_constraint_flag[0] | — | tool-e: 0 | tool-f: 0 | — |
| coding_tool_constraint_flag[1] | — | tool-g: 1 | 1 | — |
| coding_tool_constraint_flag[2] | — | 1 | 1 | — |
| ... | | | | |
| coding_tool_constraint_flag[maxC−1] | — | 1 | 1 | — |
| subset_constraint_flag[3] | 1 | 1 | 1 | 1 |
| ... | | | | |
| subset_constraint_flag[maxS−1] | 1 | 1 | 1 | 1 |

As shown in Table 27, the subset syntax element may be set to "1" (subset_constraint_flag[i]=1) for a subset on which the constraint is imposed, and may be set to "0"

The video decoding apparatus may set whether to turn on/off the target coding tools based on the constraint/enabled syntax element (S1150).

Embodiment 3-3

In Embodiment 3-3, corresponds to a method of setting a subset syntax element for all subsets, setting a constraint syntax element for all coding tools when no constraint is imposed on the subsets, and setting the enabled syntax element for all coding tools regardless of whether the constraint is imposed on the coding tools.

An example of the syntax structure of Embodiment 3-3 is shown in Table 28 below.

TABLE 28

|  | Descriptor |
|---|---|
| profile_tier_level( ) { | |
|   profile_idc | |
|   for( i = 0; i < maxS ; i++ ) { | |
|     subset_constraint_flag[ i ] | u(1) |
|     if ( ! subset_constraint_flag[ i ] ) { | |
|       for( j = 0; j < maxC ; j++ ) | |
|         coding_tool_constraint_flag[ j ] | u(1) |
|     } | |
|   } | |
| ... | |
|   for( i = 0; i < maxS ; i++ ) { | |
|     if ( ! subset_constraint_ flag[ i ] ) { | |
|       for( j = 0; j < maxC ; j++ ) | |
|         coding_tool_enabled_flag[ j ] | u(1) |
|     } | |
|   } | |
| ... | |

As shown in Table 28, the video encoding apparatus may set whether to impose a constraint on subsets for all (maxS) subsets using a subset syntax element (e.g., subset_constraint_flag[i]), and set whether to impose a constraint on coding tools for all (maxC) coding tools using the constraint syntax element. In addition, the video encoding apparatus may set whether to use coding tools for all (maxC) coding tools using the enabled syntax element.

In this embodiment, the bitstream may contain maxS subset syntax elements, maxC constraint syntax elements and maxC enabled syntax elements.

The video decoding apparatus may decode the profile syntax element (S1210) and decode a specific (i-th) subset syntax element among the maxS subset syntax elements (S1220). When the i-th subset syntax element does not indicate that the constraint is imposed, the video decoding apparatus may decode the maxC constraint syntax elements (S1230) and decode the maxC enabled syntax elements (S1240). The video decoding apparatus may decode all constraint syntax elements and all enabled syntax elements for all subsets while sequentially increasing i.

The video decoding apparatus may set whether to turn on/off the target coding tools based on the constraint/enabled syntax elements (S1250).

Embodiment 3-4

Embodiment 3-4 corresponds to a method of indicating whether to apply a coding tool using one syntax element (a disable syntax element).

The syntax structure of this embodiment is shown in Tables 29 and 30 below.

TABLE 29

|  | Descriptor |
|---|---|
| profile_tier_level( ) { | |
|   profile_idc | |
|   for( i = 0; i < maxS ; i++ ) { | |
|     subset_constraint_flag[ i ] | u(1) |
|     if ( ! subset_constraint_flag[ i ] ) { | |
|       for( j = 0; j < maxC ; j++ ) | |
|         coding_tool_disabled_flag[ j ] | u(1) |
|     } | |
|   } | |
| ... | |

TABLE 30

|  | Descriptor |
|---|---|
| profile_tier_level( ) { | |
|   profile_idc | |
|   for( i = 0; i < maxS ; i++ ) | |
|     subset_constraint_flag[ i ] | u(1) |
| ... | |
|   for( i = 0; i < maxS ; i++ ) { | |
|     if ( ! subset_constraint_flag[ i ] ) { | |
|       for( j = 0; j < maxC ; j++ ) | |
|         coding_tool_disabled_flag[ j ] | u(1) |
|     } | |
|   } | |
| ... | |

As shown in Tables 29 and 30, the video encoding apparatus may specify a target profile using a profile syntax element (e.g., profile_idc), may set whether to impose a constraint on subsets using a subset syntax element (e.g., subset_constraint_flag[i]) for all (maxS) subsets, and may set, when the constraint is not imposed on the subsets, whether to disable coding tools for all (maxC) coding tools using an disable syntax element (e.g. coding_tool_disabled_flag[j]).

In this embodiment, the video decoding apparatus may decode as many subset syntax elements as maxS (equal to the number of all subsets). When the constraint is not imposed on a specific subset, the apparatus may decode disable syntax elements as many as maxC (the number equal to that of all coding tools). Also, the video decoding apparatus may set whether to turn on/off target coding tools included in the target profile based on the disable syntax elements.

Embodiment 3-5

Embodiment 3-5 corresponds to a method of setting a subset syntax element only for the target subset, or setting a coding tool syntax element (constraint/enabled syntax element or disable syntax element) only for target coding tools in Embodiments 3-1 to 3-4 described above.

In order to set the syntax elements only for the target subset or target coding tools, maxS or maxC used in Embodiments 3-1 to 3-4 must be reassigned or reset. The resetting may be implemented through Equations 2 and 3 below.

$$maxS = \text{maxofSubSets}[profile\_idc] \quad \text{[Equation 2]}$$

$$maxC = \text{MaxofCodingTools}[subset] \quad \text{[Equation 3]}$$

MaxofSubSets[i] is an array indicating the number of subsets included in the i-th profile, and MaxofCodingTools[i] is an array indicating the number of coding tools included in the i-th subset.

The encoding control means may specify a target profile using the profile syntax element, and reset maxS to be equal to the number of subsets included in the target profile. The encoding control means may set coding tool syntax elements as many as the reset maxC. Accordingly, the subset syntax element may indicate whether or not the constraint is imposed only for the target subset included in the target profile, and the coding tool syntax element may indicate the application status only for the target coding tool.

In this embodiment, the video decoding apparatus may decode the subset syntax elements as many as the reset maxS (or the target subsets), and decode the coding tool syntax elements as many as the reset maxC (or target coding tools). Also, the video decoding apparatus may set whether to turn on/off the target coding tools based on the coding tool syntax element.

Embodiment 4

Embodiment 4 corresponds to a method of pre-defining one or more representative profiles (hereinafter referred to as "representative profile") from among all profiles, specifying any one of the profiles included in the representative profiles using syntax elements, and specifying a sub-profile included in the specified profile. The sub-profile may be defined and used by a third party organization (e.g., ITU-T).

The sub-profile may correspond to a subset of coding tools included in the representative profile, and may be a group including coding tools for a specific purpose. For example, only royalty-free coding tools may be included in the sub-profile. The representative profile may be used as a decoding profile for a corresponding sequence, and the sub-profile may be used as information on a coding tool actually used in the corresponding sequence.

An example of a sub-profile given on the assumption that the profiles (profile-A, profile-B, profile-C, and profile-D) defined in Table 5 are representative profiles is shown in Table 31 below.

TABLE 31

| Profile name | 1$^{st}$ tool | 2$^{nd}$ tool | 3$^{rd}$ tool | 4$^{th}$ tool | 5$^{th}$ tool | ... | max$^{th}$ tool |
|---|---|---|---|---|---|---|---|
| Profile-A | tool-a | tool-b | tool-c | — | — | — | — |
| Profile-A.1 | tool-a | — | tool-c | — | — | — | — |
| Profile-B | tool-a | tool-c | tool-d | tool-e | tool-g | — | — |
| Profile-B.1 | tool-a | tool-c | tool-d | — | — | — | — |
| Profile-B.2 | — | — | tool-d | tool-e | tool-g | — | — |
| Profile-C | tool-b | tool-d | tool-f | — | — | — | — |
| Profile-C.1 | — | tool-d | tool-f | — | — | — | — |
| Profile-D | tool-b | tool-c | tool-f | tool-g | — | — | — |
| Profile-D.1 | tool-b | — | tool-f | — | — | — | — |

As shown in Table 31, Profile-A.1 may be included as a sub-profile in Profile-A, Profile-B.1 and Profile-B.2 may be included as sub-profiles in Profile-B, Profile-C.1 may be included as a sub-profile in Profile-C, and Profile-D.1 may be included as a sub-profile in Profile-D.

The syntax structure of this embodiment is shown in Table 32 below.

TABLE 32

| | Descriptor |
|---|---|
| profile_tier_level( ) { | |
|   profile_idc | |
|   sub_profile_idc | |
|   ... | |

As shown in Table 32, the video encoding apparatus may specify or define any one of the representative profiles using a profile syntax element (e.g., profile_idc, a representative profile syntax element). The video encoding apparatus may also specify or define one or more sub-profiles (sub-profiles including the actually enabled coding tools) among the sub-profiles included in the specified profile, using a sub-profile syntax element (e.g., sub-profile_idc or general_sub_profile_idc). The sub-profiles specified by the sub-profile syntax element may correspond to target profiles.

There may be multiple sub-profile syntax elements. That is, multiple sub-profiles may be indicated by the sub-profile syntax elements. In this case, information on the number of sub-profile syntax elements (e.g., num_sub_profiles) may be additionally signaled.

In this embodiment, the video decoding apparatus may decode the representative profile syntax element from a bitstream (S1510), and decode the sub-profile syntax element from the bitstream (S1530). A sub-profile indicated by the sub-profile syntax element among the sub-profiles included in the representative profile indicated by the profile syntax element may be specified as a target profile. In an embodiment in which multiple sub-profile syntax elements are signaled, the video decoding apparatus may first decode information on the number of sub-profile syntax elements (S1520), and then decode the sub-profile syntax elements as many as the number indicated by the decoded number information (S1530).

Once whether to turn on/off the coding tools is determined through the various embodiments described above, a process of setting variables/flags as shown in Tables 33 and 34 below may be performed. Table 33 shows a process of setting variables/flags using the profile syntax element (profile_idc) and the enabled syntax element (coding_tool_enabled_flag[j]), and Table 34 shows a process of setting variables/flags using the profile syntax element (profile_idc) and the disable syntax element (coding_tool_disabled_flag[j]).

TABLE 33

```
if ( profile_idc == Profile_A ) {
  merge_enabled_flag = coding_tool_enabled_flag[ 0 ]; // tool-a
  CCLM_enabled_flag = coding_tool_enabled_flag[ 1 ]; // tool-b
  TMV_enabled_flag = coding_tool_enabled_flag[ 2 ]; // tool-c
} else if ( profile_idc == Profile_B ) {
  merge_enabled_flag = coding_tool_enabled_flag[ 0 ]; // tool-a
  TMV_enabled_flag = coding_tool_enabled_flag[ 1 ]; // tool-c
  DBF_enabled_flag = coding_tool_enabled_flag[ 2 ]; // tool-d
  BIO_enabled_flag = coding_tool_enabled_flag[ 3 ]; // tool-e
  SAO_enabled_flag = coding_tool_enabled_flag[ 4 ]; // tool-g
} else if ( profile_idc == Profile_C ) {
  CCLM_enabled_flag = coding_tool_enabled_flag[ 0 ]; //tool-b
  DBF_enabled_flag = coding_tool_enabled_flag[ 1 ]; // tool-d
  affine_enabled_flag = coding_tool_enabled_flag[ 2 ]; // tool-f
} else if ( profile_idc == Profile_D ) {
  CCLM_enabled_flag = coding_tool_enabled_flag[ 0 ]; // tool-b
```

TABLE 33-continued

```
  TMV_enabled_flag = coding_tool_enabled_flag[ 1 ]; // tool-c
  affine_enabled_flag = coding_tool_enabled_flag[ 2 ]; // tool-f
  SAO_enabled_flag = coding_tool_enabled_flag[ 3 ]; // tool-g
}
```

TABLE 34

```
if ( profile_idc == Profile_A ) {
  merge_enabled_flag = !coding_tool_disabled_flag[ 0 ]; // tool-a
  CCLM_enabled_flag = !coding_tool_disabled_flag[ 1 ]; // tool-b
  TMV_enabled_flag = !coding_tool_disabled_flag[ 2 ]; // tool-c
} else if ( profile_idc == Profile_B ) {
  merge_enabled_flag = !coding_tool_disabled_flag[ 0 ]; // tool-a
  TMV_enabled_flag = !coding_tool_disabled_flag[ 1 ]; // tool-c
  DBF_enabled_flag = !coding_tool_disabled_flag[ 2 ]; // tool-d
  BIO_enabled_flag = !coding_tool_disabled_flag[ 3 ]; // tool-e
  SAO_enabled_flag = !coding_tool_disabled_flag[ 4 ]; // tool-g
} else if ( profile_idc == Profile_C ) {
  CCLM_enabled_flag = !coding_tool_disabled_flag[ 0 ]; //tool-b
  DBF_enabled_flag = !coding_tool_disabled_flag[ 1 ]; // tool-d
  affine_enabled_flag = !coding_tool_disabled_flag[ 2 ]; // tool-f
} else if ( profile_idc == Profile_D ) {
  CCLM_enabled_flag = !coding_tool_disabled_flag[ 0 ]; // tool-b
  TMV_enabled_flag = !coding_tool_disabled_flag[ 1 ]; // tool-c
  affine_enabled_flag = !coding_tool_disabled_flag[ 2 ]; // tool-f
  SAO_enabled_flag = !coding_tool_disabled_flag[ 3 ]; // tool-g
}
```

As described above, information on a coding tool actually used among multiple coding tools may be presented. Therefore, the video decoding apparatus of the present disclosure may selectively turn on/off a specific coding tool.

Figure 13:
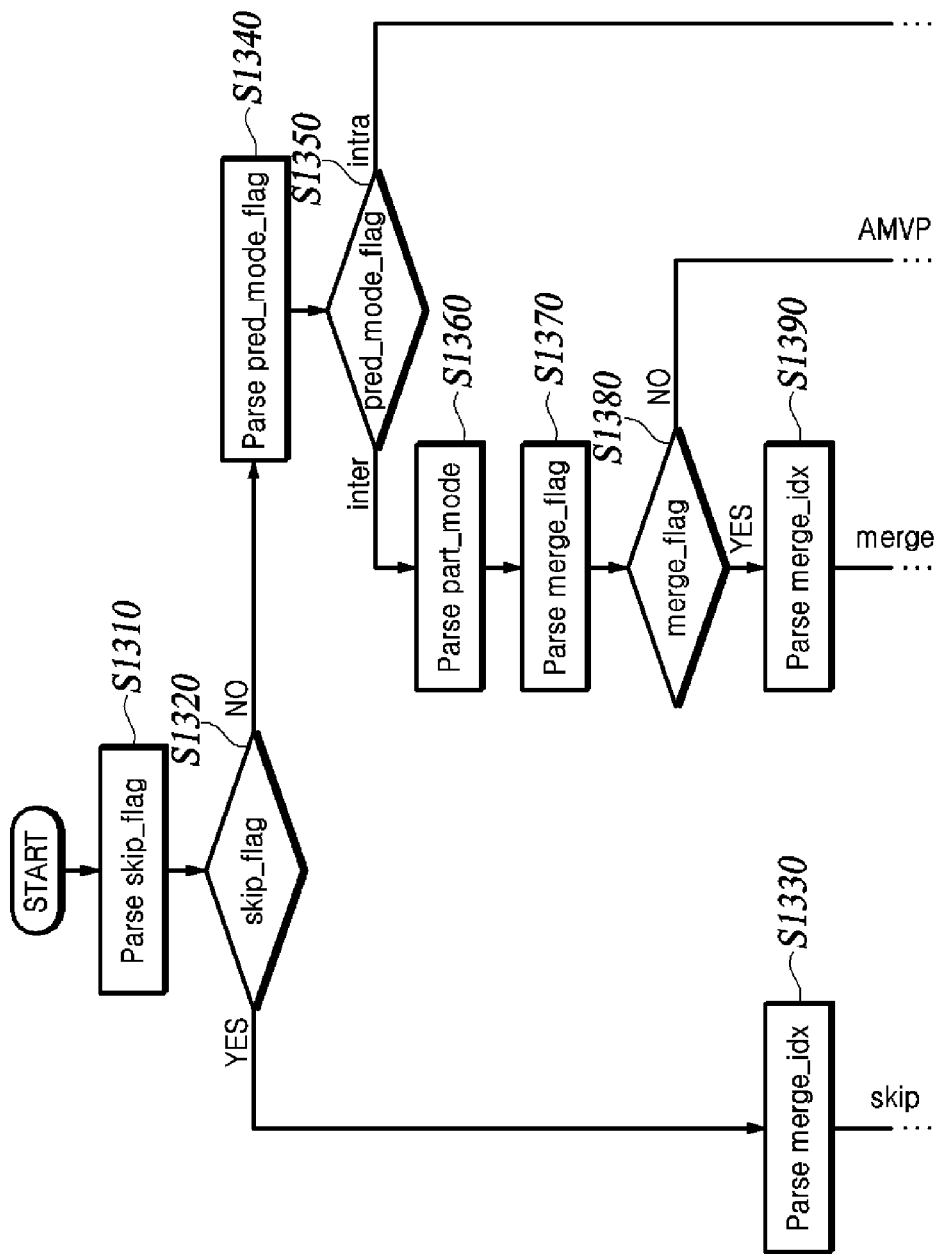
FIG. 13 is a flowchart illustrating a conventional method of determining an encoding mode.
Figure 14:
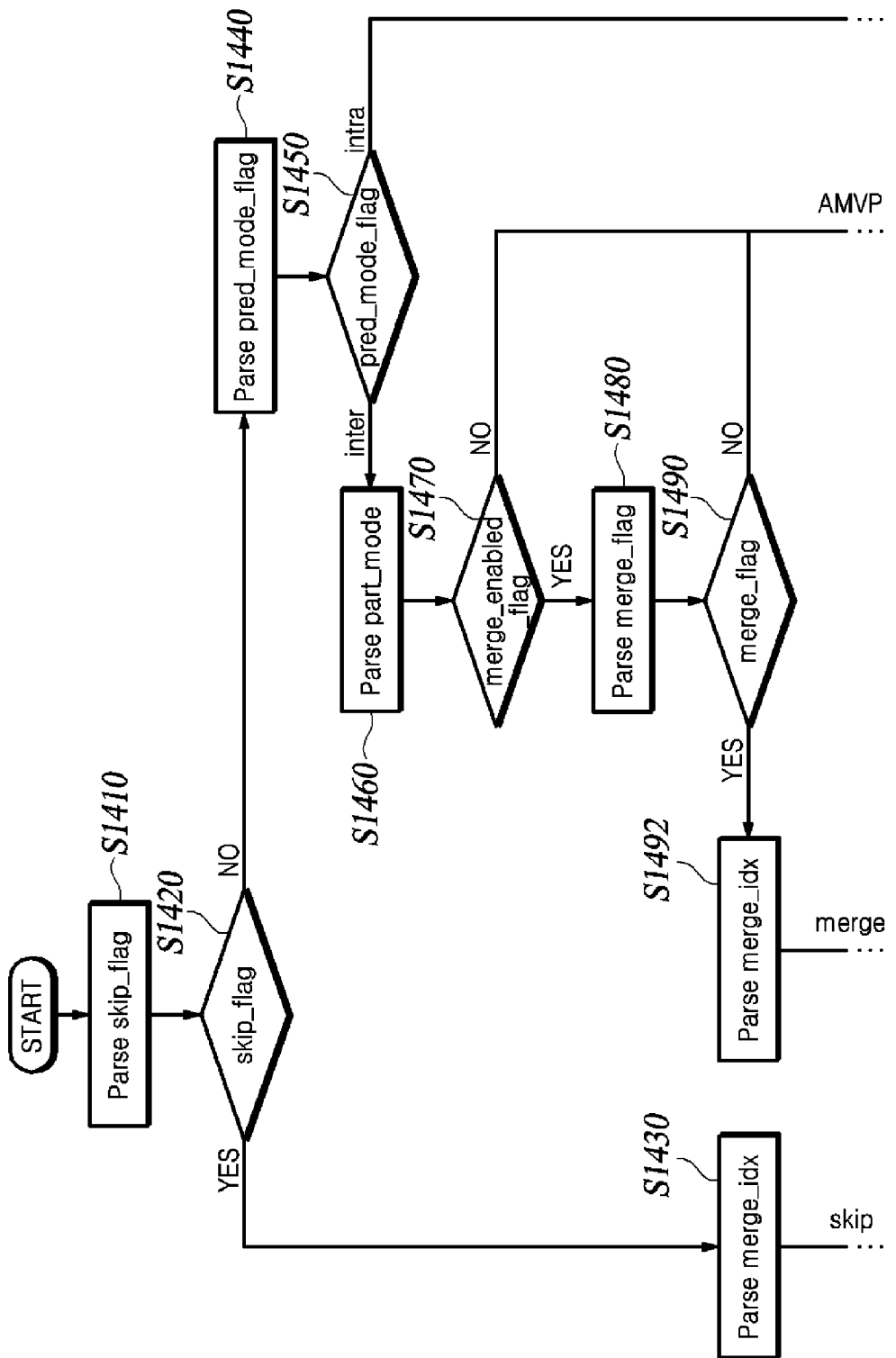
FIG. 14 is a flowchart illustrating a method of determining a coding mode to which a coding tool setting method of the present disclosure is applied.
Figure 15:
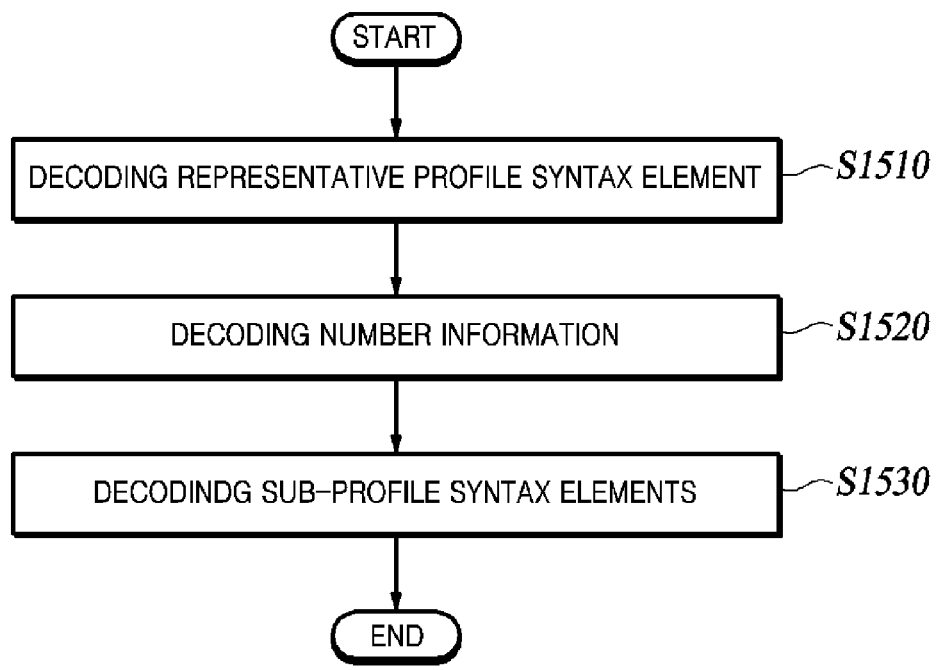
FIG. 15 is a flowchart illustrating an embodiment of the present disclosure for designating a sub-profile.

As an example, the video decoding apparatus may turn on/off the merge function based on a coding tool syntax element (merge_enabled_flag in Tables 33 and 34) indicating whether to apply the merge mode in the operation of determining an encoding mode for the current block. FIGS. 13 and 14 illustrate this example in a comparison manner.

As shown in FIG. 13, in the conventional method, whether the encoding mode of the current block is a merge mode may be determined through an operation S1310 of parsing and decoding skip_flag, an operation S1320 of determining whether the encoding mode of the current block is a skip mode according to an indication of the skip_flag, an operation S1340 of parsing and decoding pred_mode_flag when the encoding mode of the current block is not the skip mode, an operation S1350 of determining whether the encoding mode of the current block is an intra mode according to an indication of the pred_mode_flag, an operation S1360 of parsing and decoding part_mode when the encoding mode of the current block is not the intra mode, an operation S1370 of parsing and decoding merge_flag, and an operation S1380 of determining whether the encoding mode of the current block is the merge mode according to an indication of the merge_flag.

In contrast, in the present disclosure (FIG. 14), on/off the merge function may be determined before the operation S1480 of parsing and decoding merge_flag using a coding tool syntax element indicating whether to apply the merge mode. When the merge function is off, operations of determining the encoding mode of the current block may be performed with the merge mode excluded. Accordingly, the operation S1480 of parsing and decoding the merge_flag, the operation S1490 of determining what is indicated by the merge_flag, and the operation S1492 of parsing and decoding the merge_idx (S1492) may be excluded. Therefore, the complexity of determination of the encoding mode of the current block may be reduced.

Although exemplary embodiments have been described for illustrative purposes, those skilled in the art will appreciate that and various modifications and changes are possible, without departing from the idea and scope of the embodiments. Exemplary embodiments have been described for the sake of brevity and clarity. Accordingly, one of ordinary skill would understand that the scope of the embodiments is not limited by the embodiments explicitly described above but is inclusive of the claims and equivalents thereto.

What is claimed is:

1. A method performed by a video decoding apparatus, the method comprising:
   decoding, from a bitstream containing encoded video data, a profile syntax element indicating a target profile usable for decoding of the encoded video data among available profiles;
   decoding, from the bitstream, a syntax element indicating a number of sub-profile usable for decoding of the encoded video data, each of sub-profile being different from the target profile in at least one of available coding tools;
   decoding, from the bitstream, one or more sub-profile syntax elements based on said number of sub-profile, each of one or more sub-profile syntax elements indicating a respective sub-profile;
   decoding, from the bitstream, constraint syntax elements for configurable coding tools included in any of the available profiles, at least one of the constraint syntax elements indicating whether a constraint is collectively imposed on several configurable coding tools, other of the constraint syntax elements indicating whether a constraint is imposed on a respective configurable coding tool;
   decoding, from the bitstream, an enabled syntax element for each of the configurable coding tools, the enabled syntax element indicating whether to enable the respective configurable coding tool; and
   setting whether to turn on/off target coding tools for a given sequence of the encoded video data based on the enabled syntax element,
   wherein, when the constraint syntax element for a given target coding tool indicates that the constraint is imposed, the enabled syntax element for the given target coding tool is expected to indicate that the given target coding tool is not enabled, and
   wherein the constraint syntax elements for configurable coding tools are carried within a profile_tier_level structure in the bitstream.

2. The method of claim 1, wherein the setting whether to turn on/off comprises:
   setting, to on, a target coding tool not indicated as being subjected to the constraint by the constraint syntax element and indicated as being enabled by the enabled syntax element among the target coding tools; and
   setting, to off, a target coding tool indicated as being subjected to the constraint by the constraint syntax element or not indicated as being enabled by the enabled syntax element among the target coding tools.

3. The method of claim 1, wherein, when the constraint syntax element for the given target coding tool indicates that the constraint is imposed, decoding of the enabled syntax element for the given target coding tool is skipped and the enabled syntax element is inferred to indicate that the given target coding tool is not enabled.

4. The method of claim 1, wherein, when a block belonging to the given sequence is decoded, decoding of a syntax element indicating whether the target coding tool set to off is enabled for the block is skipped.

5. The method of claim 1, wherein the target coding tools for the given sequence include the configurable coding tools which are included in the target profile.

6. The method of claim 1, wherein the target coding tools for the given sequence include the configurable coding tools which are included in any of the available profiles.

7. A method performed by a video encoding apparatus, the method comprising:
   encoding, into a bitstream containing encoded video data, a profile syntax element indicating a target profile usable for decoding of the encoded video data among available profiles;
   encoding, into the bitstream, a syntax element indicating a number of sub-profile usable for decoding of the encoded video data, each of sub-profile being different from the target profile in at least one of available coding tools;
   encoding, into the bitstream, one or more sub-profile syntax elements based on said number of sub-profile, each of one or more sub-profile syntax elements indicating a respective sub-profile;
   encoding, into the bitstream, constraint syntax elements for configurable coding tools included in any of the available profiles, at least one of the constraint syntax elements indicating whether a constraint is collectively imposed on several configurable coding tools, other of the constraint syntax elements indicating whether a constraint is imposed on a respective configurable coding tool;
   encoding, into the bitstream, an enabled syntax element for each of the configurable coding tools, the enabled syntax element indicating whether to enable the respective configurable coding tool; and
   setting whether to turn on/off target coding tools for a given sequence of the encoded video data,
   wherein, when the constraint syntax element for a given target coding tool indicates that the constraint is imposed, the enabled syntax element for the given target coding tool is expected to indicate that the given target coding tool is not enabled, and
   wherein the constraint syntax elements for configurable coding tools are carried within a profile_tier_level structure in the bitstream.

8. The method of claim 7, wherein the setting whether to turn on/off comprises:
   setting, to on, a target coding tool not indicated as being subjected to the constraint by the constraint syntax element and indicated as being enabled by the enabled syntax element among the target coding tools; and
   setting, to off, a target coding tool indicated as being subjected to the constraint by the constraint syntax element or not indicated as being enabled by the enabled syntax element among the target coding tools.

9. The method of claim 7, wherein, when the constraint syntax element for the given target coding tool indicates that the constraint is imposed, encoding of the enabled syntax element for the given target coding tool is skipped and the enabled syntax element is inferred to indicate that the given target coding tool is not enabled.

10. The method of claim 7, wherein, when a block belonging to the given sequence is encoded, encoding of a syntax element indicating whether the target coding tool set to off is enabled for the block is skipped.

11. The method of claim 7, wherein the target coding tools for the given sequence include the configurable coding tools which are included in the target profile.

12. The method of claim 7, wherein the target coding tools for the given sequence include the configurable coding tools which are included in any of the available profiles.

13. A non-transitory computer readable medium storing a bitstream containing encoded video data, the encoded video data to be decoded by a process of:
   decoding, from a bitstream containing encoded video data, a profile syntax element indicating a target profile usable for decoding of the encoded video data among available profiles;
   decoding, from the bitstream, a syntax element indicating a number of sub-profile usable for decoding of the encoded video data, each of sub-profile being different from the target profile in at least one of available coding tools;
   decoding, from the bitstream, one or more sub-profile syntax elements based on said number of sub-profile, each of one or more sub-profile syntax elements indicating a respective sub-profile;
   decoding, from the bitstream, constraint syntax elements for configurable coding tools included in any of the available profiles, at least one of the constraint syntax elements indicating whether a constraint is collectively imposed on several configurable coding tools, other of the constraint syntax elements indicating whether a constraint is imposed on a respective configurable coding tool;
   decoding, from the bitstream, an enabled syntax element for each of the configurable coding tools, the enabled syntax element indicating whether to enable the respective configurable coding tool; and
   setting whether to turn on/off target coding tools for a given sequence of the encoded video data based on the enabled syntax element,
   wherein, when the constraint syntax element for a given target coding tool indicates that the constraint is imposed, the enabled syntax element for the given target coding tool is expected to indicate that the given target coding tool is not enabled, and
   wherein the constraint syntax elements for configurable coding tools are carried within a profile_tier_level structure in the bitstream.

14. The non-transitory computer readable medium of claim 13, wherein the setting whether to turn on/off comprises:
   setting, to on, a target coding tool not indicated as being subjected to the constraint by the constraint syntax element and indicated as being enabled by the enabled syntax element among the target coding tools; and
   setting, to off, a target coding tool indicated as being subjected to the constraint by the constraint syntax element or not indicated as being enabled by the enabled syntax element among the target coding tools.

15. The non-transitory computer readable medium of claim 13, wherein, when the constraint syntax element for the given target coding tool indicates that the constraint is imposed, decoding of the enabled syntax element for the given target coding tool is skipped and the enabled syntax element is inferred to indicate that the given target coding tool is not enabled.

16. The non-transitory computer readable medium of claim 13, wherein, when a block belonging to the given sequence is decoded, decoding of a syntax element indicating whether the target coding tool set to off is enabled for the block is skipped.

17. The non-transitory computer readable medium of claim 13, wherein the target coding tools for the given sequence include the configurable coding tools which are included in the target profile.

18. The non-transitory computer readable medium of claim 13, wherein the target coding tools for the given sequence include the configurable coding tools which are included in any of the available profiles.

\* \* \* \* \*